United States Patent [19]

Warman et al.

[11] 3,838,226

[45] Sept. 24, 1974

[54] AUTOMATIC TELEPHONE EXCHANGE SYSTEM WITH TIME DIVISION MULTIPLEX CONTROL

[75] Inventors: Bloomfield James Warman, Milan, Italy; John Ford Evans, Pembury, England; Stephen Sidney Walker; John Hugh McPherson, both of Walderslade, England; Alan Sutton, Dartford, England

[73] Assignee: GTE International Incorporated, New York, N.Y.

[22] Filed: Dec. 21, 1972

[21] Appl. No.: 317,312

[30] Foreign Application Priority Data

Mar. 20, 1972 Great Britain .................... 13031/72

[52] U.S. Cl. .......................... 179/18 J, 179/18 B D
[51] Int. Cl. .......................................... H04q 11/04
[58] Field of Search ......... 179/18 E S, 18 E B, 18 J, 179/18 A D, 15 A L, 18 B D

[56] References Cited

UNITED STATES PATENTS

| | | | |
|---|---|---|---|
| 3,601,546 | 8/1971 | Lee | 179/18 E B |
| 3,639,694 | 2/1972 | Deutsch et al. | 179/15 A L |
| 3,651,272 | 3/1972 | Knollman | 179/18 E S |
| 3,668,329 | 6/1972 | Hardy et al. | 179/18 J |
| 3,697,959 | 10/1972 | Abramson et al. | 340/172.5 |
| 3,749,844 | 7/1973 | Dufton | 179/18 E S |

*Primary Examiner*—Thomas W. Brown

[57] ABSTRACT

A data processing system, particularly for use in private automatic branch exchanges, in which a number of functionally different groups of service units, such as register units, local line units and main office trunk units, are connected, by means of TDM operated highways, with each other and with common units such as a master scanner, a line state discriminator, a class-of-service translator and a sequencer. There are switches for providing speech paths between the individual service units and the subscriber lines. Independently therefrom each service unit has at least one store for storing the address of a subscriber line and a comparator for detecting coincidence between a line address generated by the scanner and one contained in the store. The combination of all the stores thus provides a composite memory storing the addresses of all lines served by the exchange and capable of being interrogated by its data processing logic on a time-division-multiplex basis. In this fashion the size of the memory can be directly related to the size of the exchange as determined by the number of individual service units.

19 Claims, 7 Drawing Figures

AUTOMATIC TELEPHONE EXCHANGE SYSTEM WITH TIME DIVISION MULTIPLEX CONTROL

IMPROVEMENTS IN DATA PROCESSING APPARATUS

Figure 1:
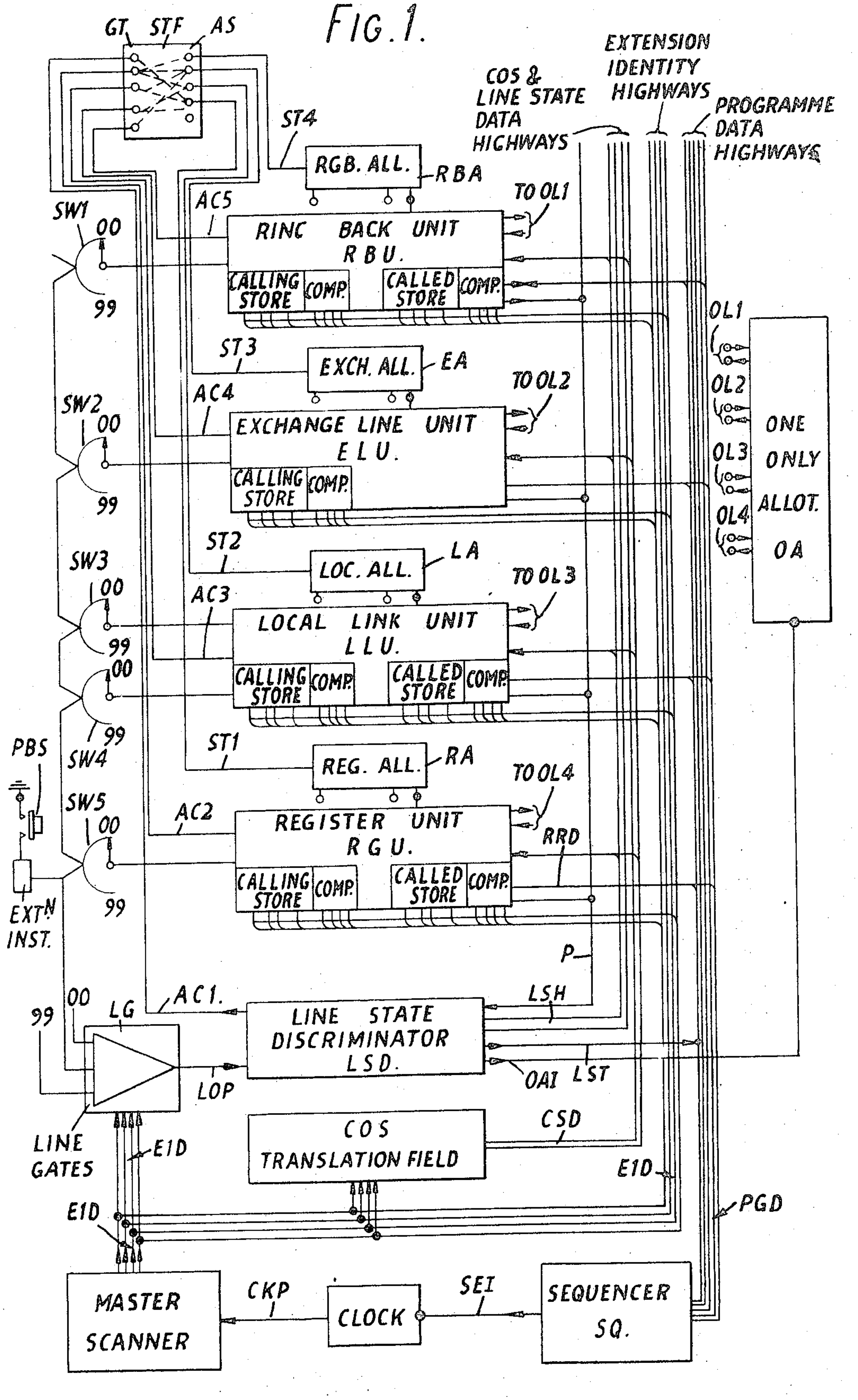

The present invention relates to data transfer systems and particularly to data transfer systems suitable for use in transferring data between apparatus units in equipments comprising a complex of functionally different apparatus units or groups of apparatus units.

Computers and automatic telephone exchanges are examples of equipments comprising a complex of functionally different apparatus units or groups of apparatus units and the invention has been conceived primarily in connection with the design of small private automatic branch telephone exchanges (P.A.B.X's) of the kind employing relay or the like switching matrices and capable of serving a small group of the order of 25 to 100 subscribers providing for intercommunication between the subscribers of the group and also providing subscribed access to a group of trunks linking the P.A.B.X. to a public telephone exchange. However, it is to be appreciated that the invention is by no means limited to this application.

In the design of small P.A.B.X. equipment difficulty arises in providing a basic system design which can readily be adapted to the needs of particular customers in an economical and efficient manner. P.A.B.X. equipment may be called upon to provide any or all of a very wide range of facilities, such as call transfer, call queueing for free trunk lines, priority busy override, and many others. These facilities can be provided without much technical difficulty if it is accepted that each apparatus unit serving to link subscribers via the switching matrices may include a full capability for all these facilities in relation to any call. This, however, would result in a very uneconomical arrangement, particularly where the initial requirement is for a very small, say 25 line, equipment providing only the simple basic facilities but which in the course of time may need to be extended to serve a larger number of lines and to provide additional facilities of the kind mentioned above, since this can involve considerable over-provision of apparatus in the early life of the equipment or extensive re-wiring and modification of existing equipment during its later life. Again, if the apparatus unit linking subscribers is broken down and separate smaller units devised to have specialized functions to be called for only when needed, then a data transfer problem arises in the transmission of data to and between the various apparatus units which may need to be taken into use on a call. Data links can of course be provided between all apparatus units and a common data sorting and addressing means, but this arrangement also suffers from the disadvantage of requiring relatively costly memories, which permit the addressing of data from one point to another of the equipment, and particularly from the need to make provision for the memories to grow during the life of the equipment to cater for the maximum number of apparatus units that may need to be addressed.

It is one object of the present invention to provide a data transmission system suitable for use in circumstances as outlined above and which minimizes difficulties of the kind described.

In the design of public telephone exchanges arrangements have previously been proposed for the rapid coupling of an allotted one of a group of register equipments to a calling one of a group of incoming junction line circuits, in which, the registers comprised storage means for storing an incoming junction line circuit identity, and an associated comparator means, in which also, an allotting means was provided in common to all the registers to pre-allot one free register in readiness to deal with the next incoming junction call, and in which scanning means was associated with the incoming junction line circuits, the scanning means, the storage means and the comparator means all being linked together by data highways and the arrangement being that upon the occurrence of a calling condition at an incoming junction line circuit, the scanner was caused to apply address data identifying the calling junction to the data highways to which the allotted register responded by storing this address. By now applying this stored address to its associated comparator means, the register in question could recognize successive occurrences of this address appearing on the data highways as appertaining to itself, and consequently the register could take action to accept further data, if any, in respect of this address, and also prevent another allocated register responding to this address. Also since the address was a direct identification of the location of the particular incoming junction line circuit, the register was also arranged to utilize the information content of the address to establish a unique path between itself and the calling junction line circuit via the exchange switching network. The present invention may be regarded as an extension of this principle of data transfer.

According to one aspect of the present invention there is provided a data processing apparatus comprising a plurality of functionally different apparatus units of which each unit includes a store for receiving data presented thereto in a predetermined code and a comparator for detecting coincidence between data stored in said unit and data presented thereto, a data generating means arranged to generate cyclically all possible combinations of coded data to be presented to said stores, said generating means being connected to all such stores in order to present the generated data simultaneously thereto, means for initially registering data in a store of at least one of said units, and means, included in or associated with each of said units or at least some of said units for transferring data stored in such a unit to a further one of said units, the said data transferring means comprising means operable when the comparator of said unit detects coincidence between the data being generated at any time and the data stored by the transferring unit, for allotting a store of a further unit to receive the data being generated at this time.

According to one embodiment of the invention at least some of said apparatus units have a plurality of stores for data, all of which are connected to said data generating means, the said data transferring means includes a sequencing unit common to all of said apparatus units for so programming the transfer of data from one unit to another that data from each of said stores of one unit is transferred consecutively to the corresponding stores of the other unit in a single transferring process in which the said receiving store allotting means operates consecutively a number of times corresponding to the number of stores, upon the detection of coincidence between the data generated and the data in each consecutive store of the one unit, to allot the stores of the other unit consecutively to receive data from the data generating means, and means is provided for preventing initiation of a transferring process by one apparatus unit until any such process initiated by another unit has been completed.

Advantageously each, or at least some, of the functionally different apparatus units form one of a group of similar units all arranged to perform the same function, each group of such units being linked by an allotting means arranged to select a single free unit of the group to receive data at each data registering or data transferring process.

The arrangement according to the invention enables a very versatile construction of data processing apparatus to be provided, which is adaptable to include any of a variety of functional units and in which for any given function the number of units available can be varied as required in order to meet the demand of this function.

Although not limited to any particular field of data processing, the invention is especially applicable to automatic telephone exchanges, and in one embodiment of telephone exchange according to the invention the said data generating means referred to above comprises a means for generating the addresses of telephone lines of the exchange, one of said functionally different units, or each unit of one of said groups of units, comprises a register with two stores for receiving calling and called line addresses respectively and with means for establishing a switched connection with the line identified by an address in at least the first one of said stores, the remaining functionally different units being arranged to perform functions ancillary to that of the register and to receive data from the latter and/or to transfer data between themselves, and the said means for initially registering data comprises a telephone line scanner synchronized to the address generator and arranged to enter the identity of a scanned calling line in the first store of the register, and further comprises a means for entering in the second store of the register dialed digits identifying a called line address and received via a line identified by the address in said first store.

In addition to register units, the exchange may be provided with units providing any other desired facility of a telephone exchange. For example a further one of said functionally different units, or each unit of a further one of said groups may comprise an external exchange line unit linked to an outgoing line from the automatic exchange and including a single store to receive the address, as the case may be, either of a calling line by way of data transferred from said register, or of a line called, by way of data transferred from a store of a further one of said functionally different units in which store the called line address may be entered directly in response to an incoming call from the external exchange, said exchange line unit further including means for establishing a switched connection between said outgoing line and the line identified by the address in its store.

In order to take account of the state of a telephone line, e.g. "free", "busy" or "parked" condition, or to regulate the exchange facilities available to a calling line in accordance with the status or "class-of-service" of a given line the exchange according to the invention will also normally include, synchronized to the said telephone line address generator, means for generating data indicating the class-of-service apertaining to each telephone line address generated and means for discriminating the line state of each address generated. Thus, according to a preferred embodiment of the invention, each or at least some of said functionally different units or groups of units may include, associated with each store thereof, supervisory logic circuits for receiving, either during a data transfer process or upon coincidence between an address entered in said store and the address generated by said address generator, class-of-service data and/or line state data corresponding to the telephone line address entered in said store, said logic circuits being arranged to control the data transfer process to be carried out by said unit in accordance with the data recieved.

According to another aspect thereof the invention relates to an automatic telephone exchange switching system incorporating a novel storage and memory arrangement for access by the data processing logic of the exchange, and in particular to an exchange employing space divided two wire switching of the speech paths.

In conventional exchanges employing space divided two wire connection of the speech paths to subscriber lines, it has hitherto been considered essential to have a central memory store for storing the addresses of subscriber lines with which connections are established by said switch means, to enable processing of calls by a central data processor of the exchange. However, this requirement for a central store and associated data processor has hindered the provision of an exchange capable of versatile adaptation to provide for a variation in the number of subscriber lines to be served by the exchange, since the central store has a capacity corresponding to the number of lines to be served by the exchange and would either be under utilized by an exchange having a smaller number of subscriber lines or would require replacement in order to enable the number of lines to be increased.

It is accordingly a further object of the invention to provide an automatic telephone exchange system having a memory store arrangement capable of flexible adaptation to serve a differing number of subscriber lines according to the required size of the exchange.

According to this other aspect thereof the present invention provides an automatic telephone exchange system comprising a plurality of separate functional units each including switch means for establishing two wire speech path switching to subscriber lines of the exchange, a store associated with each switch means and providing, independently of the conductive path of the switch, a memory for storing the address of a telephone line with which a connection is established by said switch, means for generating cyclically and successively the addresses of all telephone lines served by the exchange, and, associated with each store, a comparator for producing an output signal on coincidence between a line address generated and an address contained in said store, the arrangement being such that the combination of all of said stores provides a composite memory storing the addresses of all exchange lines served by the exchange at any given time and capable of being interrogated by data processing logic of the exchange on a time division multiplex basis defined by said address generating means, while continuous speech paths are established by said switch means.

In accordance with this aspect of the invention, the concept of providing individual switch means with associated memory stores to build up the memory store of the exchange enables a central memory store to be eliminated, and the size of the store to be directly related to the size of the exchange as determined by the number of functional switching units of the exchange. Moreover the provision of switch means with associated memories can be effected in a simple manner, since it is inherent in the function of any switch that it incorporates some form of memory which is generally a property of the actuating means of the switch. Thus in its simplest terms a manually operable wall switch has a toggle lever which can be considered as a binary memory store indicating the one or off condition of the switch. This concept can be extended in relation to telephone switching means to provide the memories required in accordance with the invention.

The interrogation of the stores on a time division multiplex basis simplifies the data transfer between the stores and the control logic of the exchange, since each time slot defined by said address generating means corresponds to a particular line address and all that is required is a simple output signal from a comparator in a given time slot for the control logic to identify the line address held in a store in terms of the particular time slot.

According to one embodiment of this aspect of the invention, the data processing logic of the exchange comprises logic circuits associated with and individual to said functional units and common control logic circuits for programming the operation of the functional units of the exchange, each comparator providing an output to the logic circuits of its functional unit and all the comparators providing a common output, if necessary by way of the logic circuits of the associated functional units, to the common control logic of the exchange.

Thus by providing the logic circuits required for operation and supervision of functional units of the exchange as circuits individual to the particular units, the components providing the data processing function of the exchange can also be built up in a composite manner with the addition of functional units to the exchange. Certain common control data processing units must remain central to the exchange and these will generally be constructed to have data handling capacities determined by the number of subscriber lines of the exchange. Since in accordance with the invention these central units can be reduced to a minimum, the problem of replacement of these units for variation of the size of the exchange is not very great.

One example of a common control unit of the exchange is the means for providing the line state discriminating function, and in accordance with a further embodiment of this aspect of the invention the common control logic of the exchange accordingly includes a line scanning means, synchronized to said line address generating means, for cyclically and successively scanning subscriber line terminals of the exchange to produce an output signal in response to detection of a line looped or "off hook" condition of s subscriber telephone apparatus connected to said terminals, and a line state discriminating means connected respectively to the output of said line scanning means and to said common output of said comparators, said line state discriminating means being arranged to derive from the input signals thereto output signals indicative of the line state of subscriber line terminals scanned at any given time.

Since in this case the line scanning and line state discrimination are again on a time division multiplex basis, only the line state output signal of the discrimination means is necessary, no signal identifying the line address being needed as this is already provided by the address generating means and is inherent in the particular time slot in which a signal appears from the discriminating means. The control logic of an individual functional unit can thus process, in a given time slot corresponding to an address in a store thereof, data relating to said address and derived simply as output signals from its comparator and the line state discriminator. The same principle can be extended to other common logic units of the exchange to provide to the logic circuits of the functional units data as regards, for example, class of service.

The allocation of a particular time slot to each line address enables further simplification of common control units of the exchange as regards the storage within themselves of data appertaining to a given line address, since such data can simply be stored in a progressive store or shift register having a number of stages corresponding to the number of time slots of the address generating cycle so that the output of the store will present in any given time slot data fed thereto in the same time slot of the preceding cycle.

In the case of the line state discriminator, for example, this storage feature can be used to eliminate the means hitherto required individually to each subscriber line circuit to monitor the parked or P.G. condition of subscriber lines.

Thus in accordance with a further preferred embodiment of this aspect of the invention the said line state discriminating means has four outputs corresponding to bush, free, "calling for service" and parked line states respectively, and further has a progressive store acting as a memory to provide, during scanning of the subscriber line terminals of any line address, an output signal in response to an output signal received, during scanning of the same line terminals in the preceding scanning cycle, from either the said common output from said comparators or the said progressive store itself, the arrangement being such that the line state discriminator provides an output signal from said first output in response to input signals received at both inputs thereof, provides an output signal from the second output when no output signal is received from the line scanning means, provides an output signal from the third output when an output signal is received from the line scanning means but no output is received from said common comparator output or from said progressive store and provides an output signal from said fourth output when an output signal is received from the line scanning means, no output signal is received from said common comparator output, and an output signal appears at the output from said progressive store.

Figure 5:
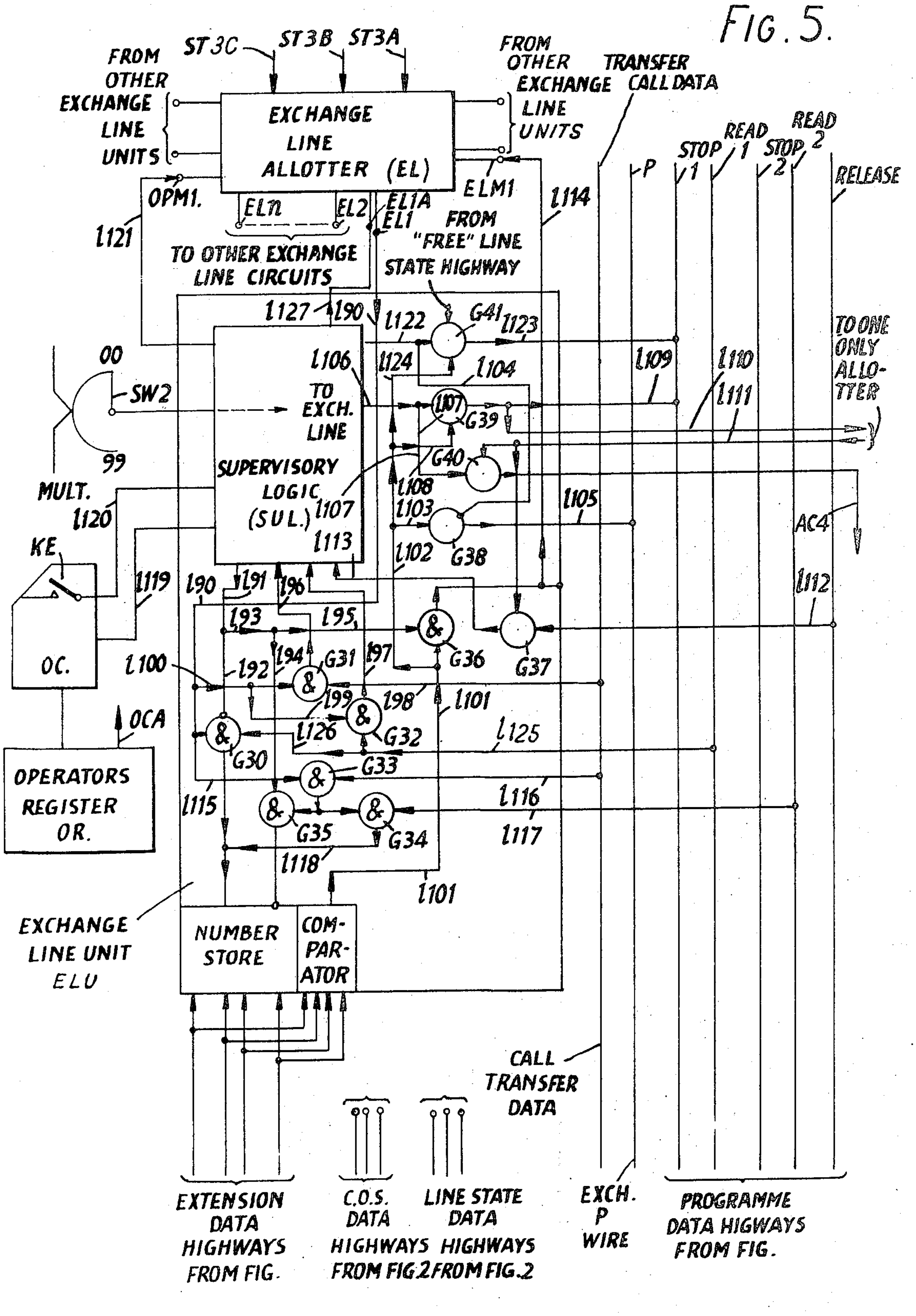
Figure 6:
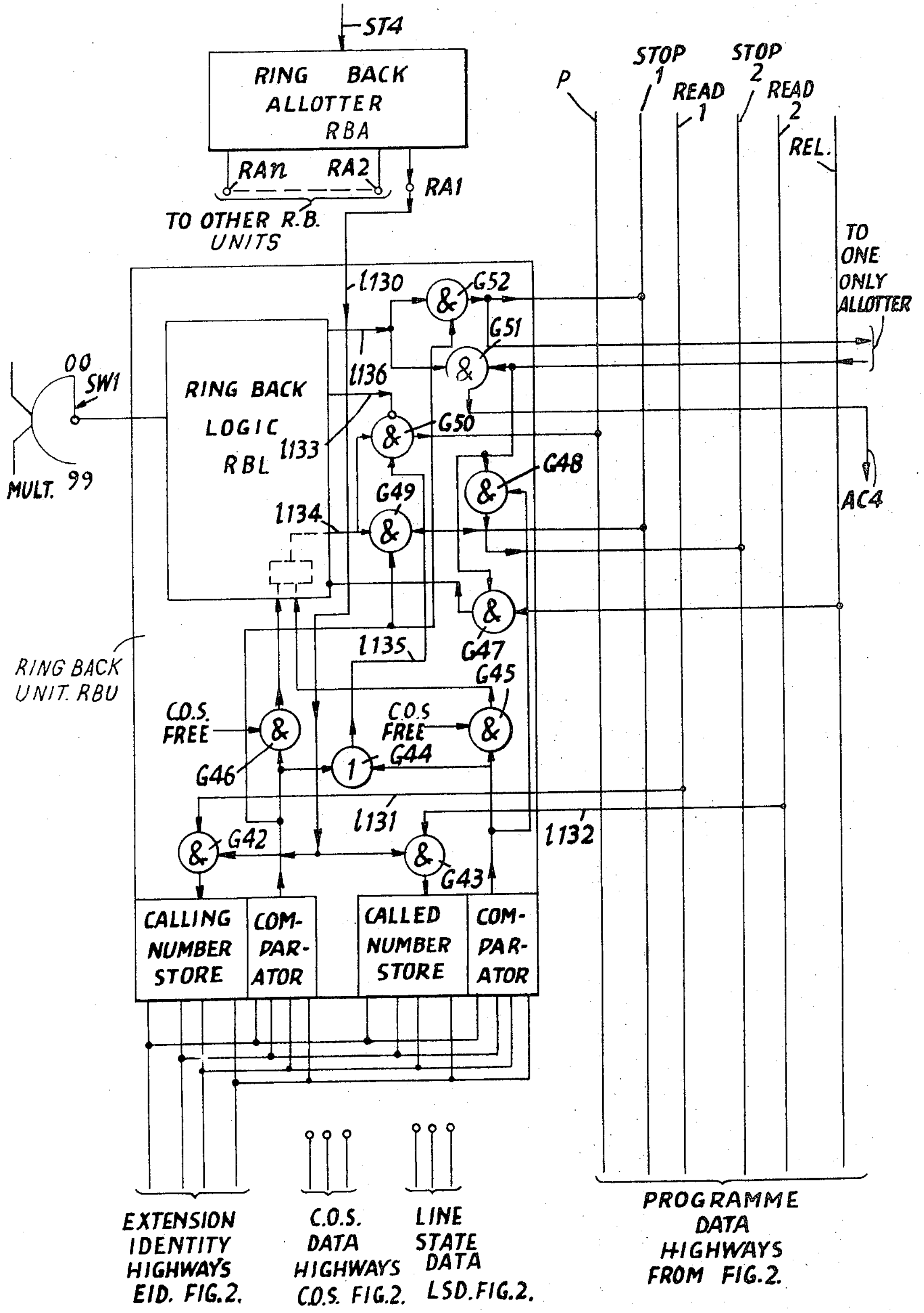
Figure 7:
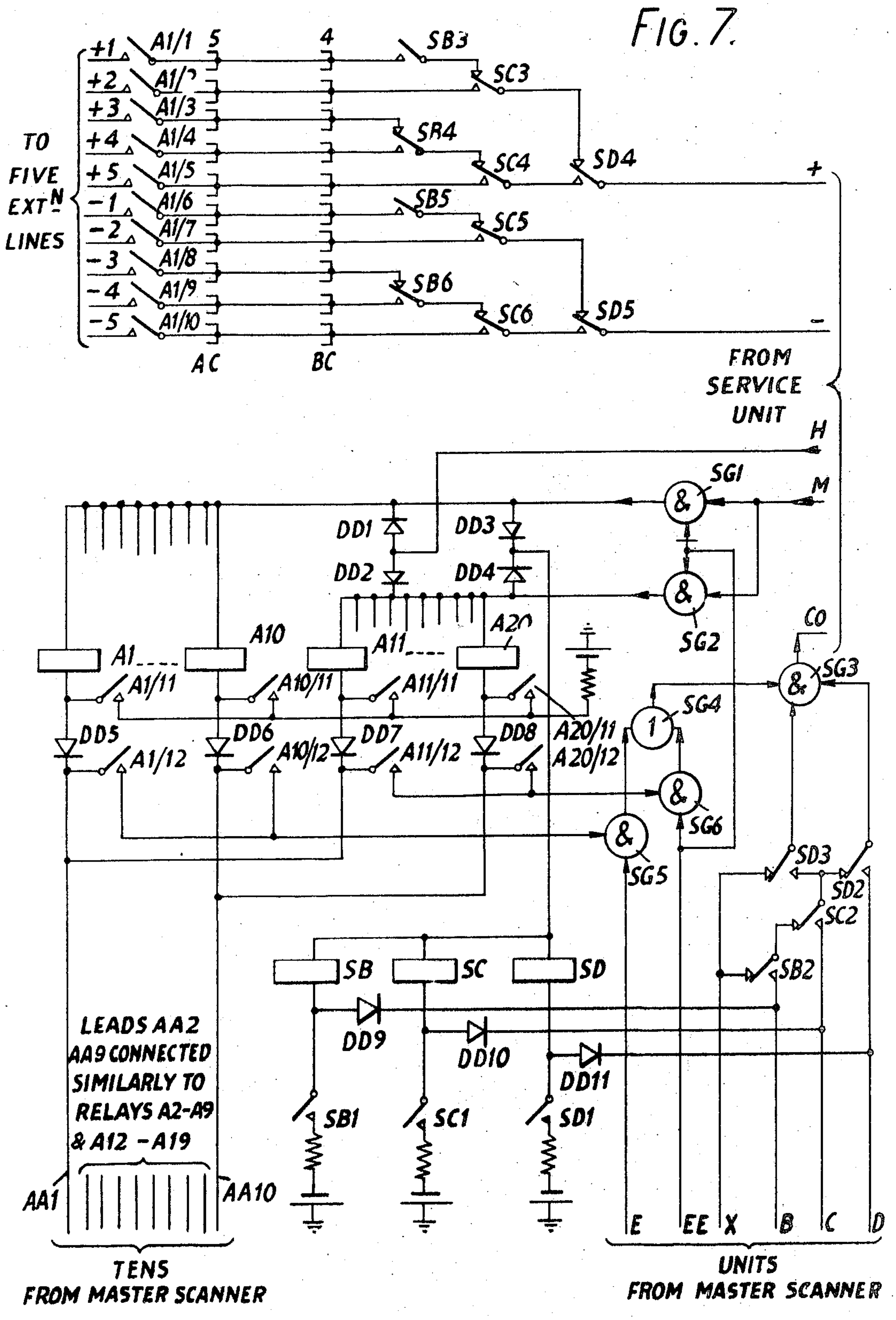

The above and other features of the invention are more fully described below with reference to the attached diagrams which illustrate the arrangement of a small 100 line Private Automatic Branch telephone exchange incorporating the invention and of which:

FIG. 1 is a block schematic diagram showing the general arrangement of the exchange system, FIGS. 2–6 illustrate the data transfer and signalling arrangements employed, in greater detail, and, FIG. 7 illustrates a particular form of speech path switch, and comparator element, suitable for use in the exchange system described.

Referring to FIG. 1, the exchange system illustrated is designed for use as a small Private Automatic Branch telephone exchange capable of serving up to 100 local extension lines, and providing access to and from a main public telephone exchange over a number of separate trunk lines. There may be as many trunk lines as required by the expected level of trunk line traffic. Each extension station served by the exchange is designated and identified by a two digit number, in the number group 00–99 inclusive, but the arrangement is such that an extension subscriber, initiating a call must dial a prefix digit to indicate the type of call required followed by the directory digits, to indicate the required destination. For example, an extension wishing to call another extension served by this exchange would dial a prefix digit, say 2, followed by the numerical identity of the required extension. If he wished to call a number served by the main public exchange, he would dial another prefix digit, say 9, followed by the directory number of the required external subscriber. As will appear from the description given below other prefix digits may be used to request particular facilities, such as executive ring-back and the like. In addition each extension telephone instrument is provided with a push button switch as indicated at PBS in FIG. 1 to enable a request for service to be effected during the course of a call after dialing has ceased, for example, to effect a local enquiry call during the course of an external trunk call.

In general the exchange system illustrated comprises a number of separate apparatus units and an associated system of data transfer highways. The apparatus units, indicated by rectangular blocks in the diagram, may be considered as belonging to one or other of two categories, viz: those whose functions are related to the services provided by the exchange and which will be termed the service units, and those whose function is related to the control of the service units and which will be termed the common units of the exchange. The data highways are indicated as forming three highway groups towards the right hand side of the drawing, in buss-bar relationship to the service units, connection being effected between particular service units and the relevant data highways by separate connecting links. The data highways serve for the transmission of data between the various units as more fully described below.

In response to the prefix dialed as described above the exchange will initiate a date transfer operation to a corresponding one of the service units, said transfer involving line addresses of the relevant calling line and, where appropriate, the called line, and said transfer initiating switching operations to connect the relevant lines to the service units under the control of internal supervisory logic of the service unit.

For the purposes of illustration, four different types of service unit are shown in FIG. 1. These are a register unit RGU, a local link unit LLU, an exchange line unit ELU and a ring-back unit RBU. However, other types of service unit could readily be provided in addition to, or as alternative to those shown. Also, to simplify the drawing, only one service unit of each type is shown, whereas in fact, a group of service units of each type would normally be provided, the number of units in each group being determined by the expected traffic level and the grade of service to be provided, as well understood by those skilled in the art. Each of the service units includes a 100 outlet switch, such as indicated by the wiper and switch banks SW1–SW5, by means of which the service units can gain access to any one of the extensions served by the exchange. Also, with the exception of the exchange line unit, each service unit has means for storing a calling and a called extension number identity and a comparator means associated with each of these stores. In the case of the exchange line unit, storage and comparator means for the calling extension number only is provided, since this unit deals only with trunk line calls and in this case the called number as dialed by the calling extension is repeated over the trunk line to the distant public exchange 11.

The switches and said storage and comparator means are coupled as described below with reference to FIG. 7.

For the allocation of particular service units as required to deal with particular service requests, each group of service units has an associated allotter circuit as indicated at RA, LA, EA and RBA. As explained in more detail below, these allotters serve to allot a free or specified one of the service units of a group to deal with a service request, and the arrangement is such that each service unit of a group can control the allotter associated with one, or any one of a number, of the other groups of service units. For this purpose the service units in the groups represented by the units RGU, LLU, ELU and RBU, as well as the common line state discriminator unit LSD, described below, each have one or more allotter calling leads such as the leads AC1, AC2, AC3, AC4 and AC5 shown towards the left hand side of FIG. 1. For simplicity of drawing, only one allotter calling lead from each of the units is shown, but, as will appear from the later description, the service units may each have a number of allotter calling leads each of which serves to enable the allotter serving a particular other service group to be called. Similarly, each of the allotters RA, LA, EA and RBA, has one or more start input leads of which only one is shown for each allotter and designated ST1, ST2, ST3, and ST4, respectively. To enable the allotter calling leads AC1–AC5 to be selectively interconnected with the allotter start leads, these leads are connected to respective ones of the terminals GT and AS in a strappable terminal field indicated at STF in FIG. 1. It will be appreciated from the later description that exchange systems in accordance with this invention may be provided each with differing facilities simply by providing service unit groups appropriate to the particular range of facilities required, the terminal field STF providing a programming strapping field whereby the functional units are caused to interwork with one another in a required manner. The various logic and switching circuit elements required in the various service units for the performance of their respective functions are, in general, well known to those skilled in the art and since the detail operation of these elements plays no part in the understanding of the present invention this detail has been omitted from the drawings attached to this specification. It may be noted, however, that the exchange provides only for two wire speech path switching, i.e.

the switches, such as SW1-SW5 shown in FIG. 1 together with their multipling and line connecting leads each represent the two wires of a speech path and in practice would be duplicated. For the purpose of line busying, the exchange provides the equivalent of a private wire which takes the form of a special T.D.M. highway "P", to which the various service units are linked, as also described in more detail below.

The common units of the exchange comprise a master scanner, a line state discriminator, a class-of-service translation unit and a sequencer unit. The master scanner is driven by clock pulses supplied by a central clock and generates successively and cyclically the numerical identities of the 100 extensions served by the exchange. These identities are applied, at each scanner step, in the form of signal pulses on a group of extension identity highways EID, the signal pulses being applied to appropriate ones of the highways so that the tens and units digits of the identities are conveyed in parallel code form. The sequencer in effect programs the operation of the exchange by determining the order in which data is transferred from one unit to another within the exchange. To this end a group of program data highways PGD is provided, over which program signals can be passed between the sequencer and other units of the exchange as described more fully below. The sequencer also provides an inhibiting output over the lead SEI to stop the central clock and hence arrest the scanning action of the master scanner whenever an operation is to be performed in respect of the identity being generated by the master scanner at that time. Also associated with the master scanner is a group of 100 line gates LG, there being one line gate for each of the 100 extension lines served by the exchange, the arrangement being such that when an extension assumes the calling condition, the associated line gate is primed. The line gates are interrogated successively and cyclically by signals derived from the line identities fed to them from the master scanner over the EID highways, so that whenever a primed line gate is interrogated, a line looped signal is passed over the common output lead LOP from the line gate group. The line looped signals on the lead LOP are applied to the line state discriminator unit, which from stored information regarding the condition of the lines during the previous scanner cycle and from other information fed to it over the exchange P wire, determines in respect of each line identity as it is generated, whether that line is calling for service is free, busy (i.e. served or being served), or is in the so-called parked condition, i.e. a line which has appeared as a calling line from which a register has timed-out because of failure to receive dialed digits from the line. The free, busy and parked line conditions are signalled from the line state discriminating unit over respective ones of a group of three line state highways LSD, to which all service units have access. For the calling-for-service condition, a signal is applied to the allotter calling lead AC1, which is connected via a strapping in the terminal field STF to the register allotter start lead ST1, thus causing a free register to be allocated to serve the calling extension line. The extension identity highways EID are also connected to a class-of-service (COS) translation field which provides a further group of COS data highways, there being one data highway for each COS. Thus, as each indentity is generated a class-of-service signal appropriate to that extension, i.e. ordinary, N.U. (number unobtainable), Trunks barred, Executive, etc., is applied to the respective COS highway in the highway group CSD.

In addition to the various apparatus units described above, a one-only allotter OA is associated with the service units to ensure that only one service unit can have access to the data highways at any time. This is necessary because, as explained below, it may occur that two service units are storing data in respect of the same extension identity and it is necessary to ensure that this does not cause ambiguity. It may be mentioned here that the various allotters have been indicated in the diagrams attached to this specification as separate apparatus units of the exchange, for explanatory purposes only. In the preferred arrangement these allotters comprise chain arrangements of switching elements, the components of which are located within the respective service units and interconnected by wiring extended between the relevant service units in the manner well known to those skilled in the art. Thus, in the preferred arrangement, the allotters would not appear as separate apparatus units of the exchange.

In outline the exchange system operates as follows. The master scanner operates to address all the extension stations in turn, driving the line scanning gates and at the same time offering the numerical identity codes successively and cyclically to all the stores and comparators in the service units of the exchange, over the extension identity highways EID. In step with the generation of these data addressed, supplementary data is also generated by the line state discriminator and class-of-service units, and applied to the data highways LSH and CSD respectively.

If a service unit of the exchange is already dealing with a call, it will have stored one or both of the numerical identities of the extension or extensions concerned and the stored identities are applied to the respective comparators. When a comparator detects coincidence between the stored identity and an identity appearing on the extension identity highways during successive cycles of the master scanner, the comparator produces a "yes" output signal which, inter alia, is applied to the exchange P wire to mark that extension identity busy to other service units of the exchange.

If the line state discriminator unit detects a new call requiring attention, it stops the scanner in the scan position corresponding to the calling extension identity by signalling the sequencer unit over the signalling lead LST and an appropriate one of the program data highways PGD. This causes the numerical identity of the calling subscriber to be staticised on the identity highways EID. At the same time a free register is allotted for use on the call by a signal passed from the L.S.D. unit to the register allotter RA over the allotter calling and start leads AC1 and ST1 as previously described. The allotted register reads the staticised identity into its calling number store under control from the sequencer unit via the program data highways and the speech path switch SW5 is set to the calling line. The master scanner resumes its scanning action, while the register sends dial tone and accepts the dialed impulse trains of the wanted number. If the call is a local, extension to extension call this is indicated by the dialed prefix digit (2) and causes the register to store the called extension identity in its called number store. If the call is an external exchange line call, only the prefix digit (9) indicating this is recorded by the register.

When the register has received all the dialed digits required for a call, it transfers this information to another service unit of the exchange which is designed to deal with the type of call required. It does this in substantially the same manner as that just described for a new call, that is, the register stops the scanner at the scan position corresponding to the calling extension identity it wishes to transfer by signalling over a connecting lead RRD and the relevant program highway PGD. At the same time the register applies to the "one-only" allotter OA for permission to use the data transfer highways, by signalling over the appropriate one of the pair of leads OL4 which extend between the register unit and the one-only allotter. When the data highways are free, the one-only allotter returns a "GO" signal to the register, upon the receipt of which the register applies for a service unit of the type to which it wishes to transfer the information by now applying a signal to an allotter calling lead such as AC2 and an appropriate allotter start lead as determined by the strapping in of the programming terminal field STF, for example, the allotter start lead ST2 and the allotter LA for a local call or the allotter start lead ST3 and the allotter EA for an exchange line call. This results in a free one of the required group of service units being allocated and the identity code staticised on the identity highways EID read into its calling number store. If the register has further information to transfer, for example a called extension identity, the scanner is allowed to scan on until it reaches this second identity whereupon it is again stopped to enable the second identity to be read into the called number store of the allocated service unit. The register is then released and the scanner resumes its normal scanning action.

A service unit holding a call may wish to call in the assistance of another service unit, for example, where an enquiry or call transfer is to be effected, and this is done in substantially the same manner as outlined above for the register. After the service unit to which data has been transmitted has completed its action, in order to transfer the call back to the original service unit, it merely has to stop the scanner on the given address, (i.e. the calling extension identity) so that the comparator in the originating circuit can recognize the identity on the identity highways as appertaining to itself. This circuit will then call for the allotter serving its own group to set itself up. The master scanner is then allowed to resume scanning until the identity to be passed back (e.g. the new subscriber transfer number) is reached whereupon the master scanner is again arrested and this identity will be read into the originating circuit store for appropriate action.

It will be appreciated that this data transfer process can be expanded to cover a virtually unlimited number of sources and destinations catering for transfer of information for as many service unit types as may ever be necessary to add. This addition providing an entirely parallel attachment permitting the addition of extra facilities on a plug-in basis if required, at any time during life with only a minimum amount of modification being required to the existing equipment.

The operation of the exchange system in dealing with different types of call using the method of data transfer according to the present invention will now be described in greater detail with reference to FIGS. 2–6 of the attached drawings. Also, since the construction of the above described exchange precludes the use of a central line address memory difficulties arise with line state discrimination, and the details of a novel line state discriminating means according to a preferred feature of the invention, which avoids the necessity both for a central memory and for individual line circuit monitoring means will become apparent from the description given below with reference to FIGS. 2 and 7.

Figure 2:
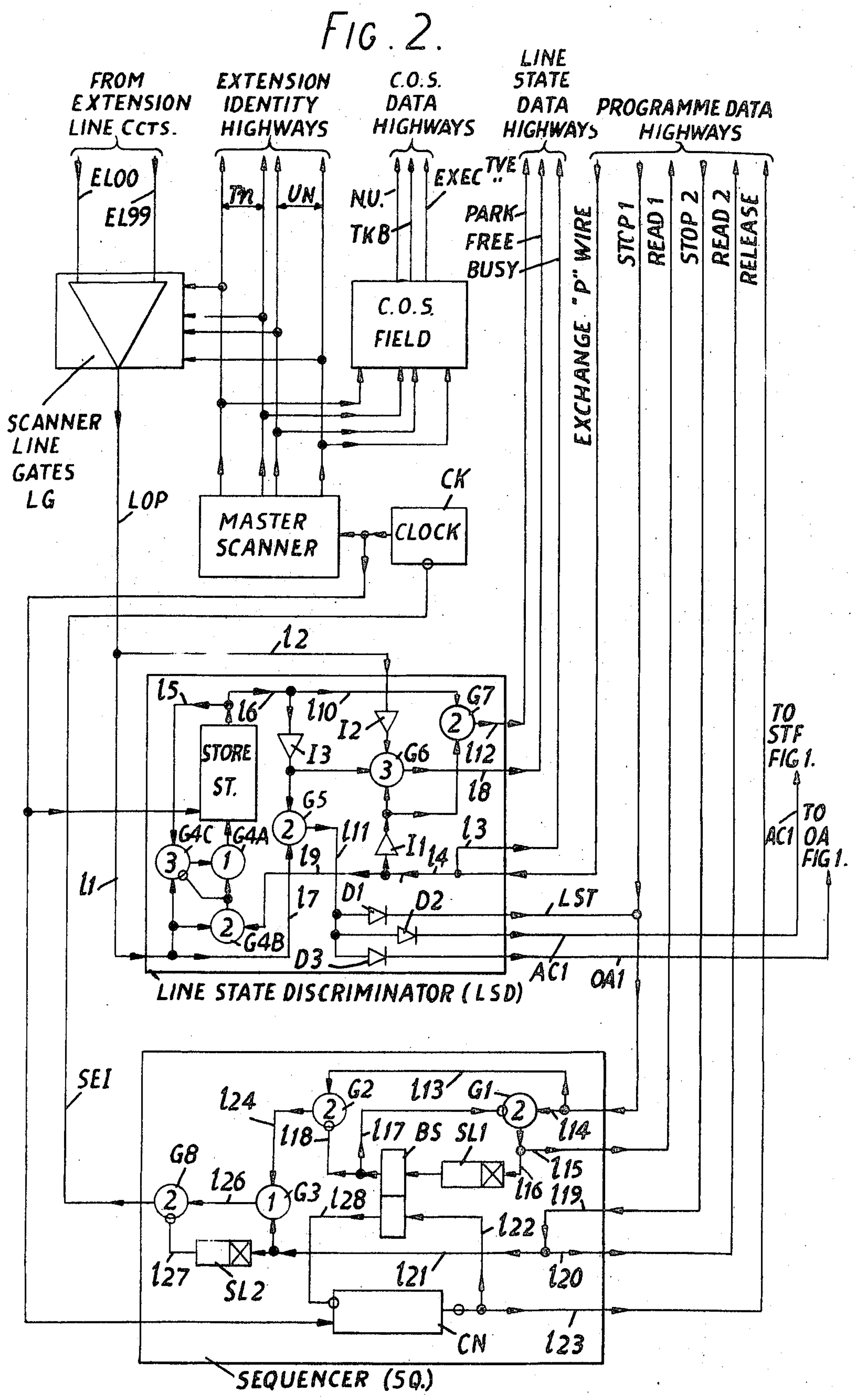

Referring firstly to FIG. 2 of the drawings, this shows the common units and main data highways of the exchange only in sufficient detail to enable the method of data transfer used to be clearly described and understood. It will be apparent to those skilled in the art that the logic details shown for explanatory purposes could very well be replaced by other more complex and sophisticated arrangements.

As previously described, the scanner line gate unit LG comprises a group of 100 coincidence of two gates, for example, these may be constituted by gates of the well known pulse-plus-bias type, each having one input connected to one of the leads EL00–EL99 from the respective line circuits associated with the extension lines (up to 100) served by the exchange. The other input to each gate is derived from the tens and units marking signals passed to the scanner line gates from the master scanner unit, as later described. The outputs from the line gates are commoned on to the common output highway LOP. The master scanner itself may comprise any known electronic scanning circuit arrangement, for example, it may comprise two simple pattern register elements arranged in tandem and driven from an oscillator clock source, indicated at CK, the pattern registers being arranged to produce marking signals in parallel form over respective groups of output highways to indicate in any suitable code, e.g. 1 out of 10, 2 out of 5, etc., the tens and units values of the scanner count at any time. Such arrangements are well known and are such that whenever a scanner line gate, whose associated extension line is in the off-hook (looped) condition, is interrogated by the master scanner, a pulse signal is applied to the common output lead LOP from the scanner line gate unit LG. The identity highways from the master scanner are also connected to a class-of-service translation field, which may also be of any known form, and which, as previously described provides a group of COS data highways, one for each class-of-service that may be required, the arrangement being such that, as each extension identity is generated by the master scanner, a terminal, within the COS unit, unique to that identity is marked and this terminal is strapped to the COS highway appropriate to the corresponding extension subscriber or line. In FIG. 2, only three COS highways, designated N.U., TKB, and Executive are shown but, of course many more may be provided, as required.

The line state discriminator unit (LSD) comprises essentially a progressive store or shift register ST, and an associated group of gates G4A, G4B and G4C, together with logic circuitry employing coincidence gates G5, G6 and G7, inverter elements I1, I2 and I3 and decoupling diodes D1, D2 and D3. The store ST has 100 storage positions and is stepped from the master clock in synchronism with the master scanner.

The line looped (off-hook) signals on lead LOP are applied over lead l1 to one input to each of the gates G4B, G4C and G5 and over lead l2 to the inverter element I2. If an extension line is in the off-hook condition and that extension is being served by any service unit of the exchange, then when that extension identity is scanned by the master scanner, a pulse signal will occur on the exchange P wire during that scan time period. In the L.S.D. unit, this signal passes over lead l3 directly to the busy line state data highway to indicate the busy condition of this extension to the service units as later described. The P wire signal also passes over lead l4 to the inverter I1 and over lead l9 to the other input to gate G4B. Gate G4B operates to the coincidence of the line looped signal on its one input and the P wire signal on its other input and applies an output signal which passes via the OR gate G4A to the input to the store ST and which is also applied to the inhibiting input to the gate G4C. The signal applied to the input to the store ST progresses through the store in synchronism with the stepping of the master scanner and appears at the store output when this identity is again scanned during the next scanning cycle. The output from the store ST is applied, over lead l5 to the other input to the gate G4C, over lead l6 to the inverter I3 and over leads l6 and l10 to one input the gate G7. Thus so long as the busy condition of this extension persists, each time the extension identity is scanned, a pulse corresponding to the P wire pulse is applied to the busy state of line highway as above described. Also, a signal corresponding to this line identity appears on the output from the store ST but this signal is effective as an inhibiting signal only since the gates G5, G6 and G7 do not respond to the inverted signal outputs from the inverters $I_1$, $I_2$ and $I_3$ and gate G4C is inhibited from gate G4B as described above.

If an extension line is in the off-hook condition and is one requiring service for a new call, then there will be no signal corresponding to this identity on the exchange P wire, neither will there be a corresponding signal from the output of the store ST, i.e., the P wire and store output signals may be regarded as having the binary significance 0. Under these conditions, the gate G5 is operated in response to the line looped signal applied to one of its inputs over lead l7 and to the inverted, binary 1, store output signal from the inverter I3, applied to its other input. Gate G5 operating, applies an output signal over lead l11, the decoupling diodes D1, D2 and D3 and the respective signalling leads LST, AC1 and OA1, to the sequencer, register allotter and one only allotter, as described above with reference to FIG. 1. These signals initiate exchange operation to serve the calling extension as later described.

If an extension line is in the on-hook condition, i.e. is not in use, the signals on the LOP and P wire highways as well as the output signal from the store ST will all have the binary significance 0 when this line identity is scanned by the master scanner. Under these conditions the gate G6 operates to the binary 1, signals received from the inverters I1, I2 and I3, and applies an output signal over lead l8, to the free state of line highway from the LSD unit, this signal occurring during the scan time period corresponding to the extension identity concerned.

If the extension line is a so-called P.G. line, i.e. one which exhibits an off-hook condition but from which no dialed impulses are received, this will be dealt with initially as described above for a new call requiring service. A service unit, normally a register, will be allocated to serve the call and as later described this service unit will apply a signal pulse corresponding to this extension line to the exchange P wire. In the line state discriminator unit this results in a corresponding pulse signal being applied to the busy state of line highway and the gate G4B is operated to cause a marking signal corresponding to this extension identity to be inserted into the progressive store ST, as described above for a busy extension line. The answering unit now awaits receipt of dialed impulses from the extension line and upon failure of these to arrive within a predetermined time period, the answering unit will time out and disconnect itself from the extension line so that when this extension identity is again scanned, no corresponding busying pulse appears over the exchange P wire or over the busy SOL highway. The gate G4B consequently remains closed. However, assuming the off-hook condition still persists, a calling signal will be applied over leads LOP and l1 to one input to the gate G4C and a corresponding signal will appear from the output of the store ST, and is applied over lead l5 to the other input to the gate G4C. In the absence of an inhibit signal from gate G4B, gate G4C operates to re-insert the mark signal into the store ST via OR gate G4A. Thus so long as the P.G. condition of this extension line persists, a corresponding marking signal is caused to circulate through the store ST and the gates G4C and G4A. The output signals from the store ST also pass via leads l6 and l10 to one input to gate G7, to whose other input, the binary 0 signal corresponding to this extension on the exchange P wire, inverted to binary "1" by the inverter I1, is applied. Gate G7 accordingly operates to apply a marking pulse corresponding to this extension line over lead l12 to the Park state of line highway to indicate to the service units of the exchange that this extension line is P.G. and cannot be served. It will be noted that in this condition, the calling-for-service gate G5 cannot respond to the calling signal applied to its one input over lead l1, since the binary 1 output signal applied to its other input from the store ST is inverted to binary 0 by the inverter I3 thereby inhibiting the operation of this gate. Similarly, the gate G6 is inhibited by the binary 0 signals applied to its from the inverters I2 and I3.

The Sequencer unit is associated with the five program data highways shown on the right hand side of FIG. 2. Two of these highways, respectively designated "Stop 1" and "Stop 2" carry signals from the exchange units to the sequencer, the remaining three highways, respectively designated "Read 1", "Read 2" and "release" carry signals from the sequencer to the exchange units. The programming action of these signals will be clear from the description given later; for the present, for the understanding of the operation of the sequencer unit, the arrangement is that, upon receipt of a Stop 1 signal, the sequencer arrests the stepping action of the master scanner and at the same time applies a signal (Read 1) to the Read 1 highway. After measuring a brief pause to allow the Read 1 signal to take effect, the sequencer restarts the scanner and for one complete scanning cycle prevents it responding to anything other than a Stop 2 signal. Thus, if a Stop 2 signal is received over the Stop 2 highway during this scanning cycle, then, as described for the Stop 1 signal, the sequencer again arrests the scanning action and at the same time applies a signal to the Read 2 highway. After measuring a further brief pause to allow the Read 2 signal to have effect, the scanner is again restarted to complete this scanning cycle, at the end of which it passes a release signal over the Release program highway. For the excution of these operations, the sequencer unit shown in FIG. 2 comprises a group of logic gates G1, G2, G3 and G8, two slow-to-operate elements SL1 and SL2, a bistable switching element BS and a 100 position progressive counting chain CN. The circuit action is as follows. Assume a Stop 1 signal is received over the Stop 1 highway, this signal is applied over the leads 113 and 114 to one input to each of the gates G1 and G2. At this time there is no inhibiting signal present on either of the other inputs to these gates so that both gates operate. The gate G1 operating passes an output signal over the lead 115 to the Read 1 highway and over the lead 116 to initiate operation of the slow-to-operate element SL1. The gate G2 operating applies an output signal over the lead 124, OR gate G3, output lead 126 to actuate gate G8, which is also not inhibited at this time. The gate G8 operating applies a signal over the inhibiting lead SEI to stop the clock CK and hence arrest the scanning action of the master scanner. Upon the expiration of its delay period, the element SL1 operates and applies a signal to set the bistable element BS, which produces an output signal, over lead 117 to inhibit the gate G1 and over lead 118 to inhibit gate G2. Setting of the bistable BS also causes an inhibiting signal on lead 128 to be removed from the counter CN. With the inhibition of gates G1 and G2, the sequencer is prevented from responding to any further Stop 1 signals which may arrive over the Stop 1 highway and the inhibition of gate G2 removes the inhibiting signal from the inhibit highway SEI thereby allowing the clock and the scanner to restart. The counter CN is now stepped in phase with the scanner. If during this scanning cycle, a Stop 2 signal is received over the Stop 2 highway, this signal is applied, over the leads 119 and 120 to the Read 2 highway, and over the leads 119 and 121 to the input to the slot to operate element SL2 and to the OR gate G3 from where it is applied over lead 126 to actuate gate G8, which again applies the inhibiting signal to stop both the clock and the master scanner. Upon the termination of the slow-to-operate period of the delay element SL2, this element operates to apply an inhibiting signal over lead 127 to inhibit gate G8 which consequently removes the inhibiting signal from the highway SEI thereby allowing both the clock and the master scanner to restart. The counter CN continues its counting action until the end of this scan when it reaches its ultimate count, whereupon it applies an output signal over the lead L23 to the release highway and over lead 122 to reset the bistable BS. The bistable element resetting removes the inhibiting signals from the gates G1 and G2, over leads 117 and 118 and applies a resetting signal over the lead 128 to hold the counter CN in its reset position. The scanner now continues to scan in the normal manner, looking for a Stop 1 signal.

1. Registration of Calling Number Identity in Free Register Unit

Figure 3:
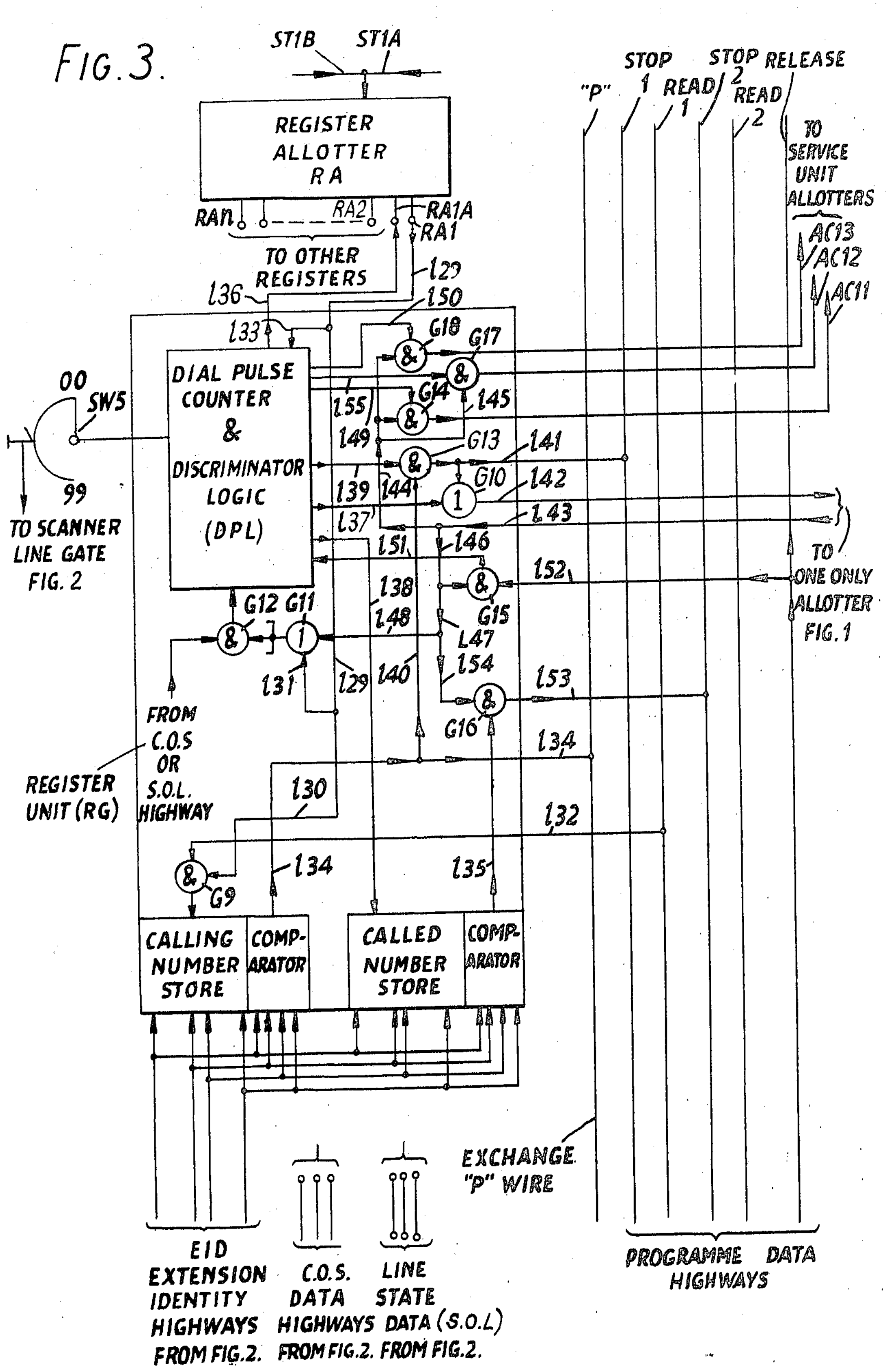

Referring now to FIG. 3 in conjunction with FIG. 2. FIG. 3 shows sufficient of the logic incorporated within a register unit to enable the required data acceptance and transfer operations performed by the register to be clearly described and understood. The detail logic for performing the functions of providing dial tone, detecting and counting dialed impulses, and first digit and class-of-service discrimination, etc., may be of any well known form and is represented in FIG. 3 by the block DPL only.

Assume that during the scanning action of the master scanner, the common L.S.D. unit detects a new call requiring service, so that the gate G5 in the L.S.D. unit is operated to apply a signal over the lead AC1 to the input of the register allotter (FIG. 3) via the program terminal field STF (FIG. 1) and an allotter start lead indicated as ST1A in FIG. 3. and over the lead LST and the Stop 1 highway to arrest the scanning action of the master scanner at the scan position corresponding to the calling extension identity. Upon receipt of the signal on its input lead, AC1, the register allotter searches over the group of register units until it encounters the first free register unit. The allotter stops at this unit and applies a marking to seize this register for use. Such allotter arrangements are well known and are not shown in detail in FIG. 2. For the present description we will assume that the allotter has stopped and has applied a marking signal to the register unit in FIG. 3 from its outlet point RA1 over the lead 129.

Within the register, the signal on lead 129 is applied over lead 133 to the register logic element DPL where it brings about a busy hold condition, for example, by operating a busy hold relay which is held operated independently of the allotter so long as the register is in use, and which causes a register busy signal to be returned to the allotter over lead 136 and the allotter input terminal RA1A. The allotting signal on lead 129 is however maintained until the start signal on the start lead ST1A is removed as described below. The signal on lead 129 is also applied via lead 130 to one input to the calling number store actuating gate G9, and via lead 131 and OR gate G11 to one input to each of a number of class-of-service and state-of-line data reading gates of which only one, G12, is shown in FIG. 3.

To simplify the drawings, the class-of-service and state-of-line data highways from FIG. 2 are shown terminated near the lower edge of FIG. 3, but in practice, these highways would extend in buss bar relationship to the various service units as indicated in FIG. 1, and are connected to the second inputs to respective ones of the gates G12 over individual connecting leads. The outputs from the gates G12 are applied to the DPL logic element where the output signals are registered in suitable storage means, there being one set of stores for registering data in respect of the calling extension identity and one set of stores for registering data in respect of the called extension identity the outputs from the gates G12 being switched from one set of stores to the other between successive data transfer operations. In general, data storage is provided in the DPL logic element to register only these items of COS and/or SOL data which the register needs to know to enable it to carry out its service function. Thus, in respect of the calling extension identity, stores are provided to record only the pertinent class-of-service data, while for the called extension identity stores are provided to record both the class-of-service and state-of-line data.

Consequent upon the master scanner having been stopped, the calling extension identity is now staticised upon the extension identity highways EOD while the class-of-service and state-of-line data is staticised on the COS and SOL data highways and, in the presence of the allot signal on lead 129 the gates G12 operate to read the calling extension class-of-service data into the calling extension data stores in the DPL logic element, as above described. At the same time the calling extension identity is read into the register calling number store, as described below.

Within the register, the extension identity highways EID are connected to the calling and called number stores as well as to their associated comparators, as described earlier above. Also, in response to the Stop 1 signal applied from the common LSD unit, a signal is applied to the Read 1 program highway from the common sequencer unit. In the register, the Read 1 signal is applied over lead 132 to the second input to the gate G9, which consequently operates to apply an energising signal to the storage elements of the calling number store, causing this store to register the calling extension identity. The calling number store now presents this identity to its associated comparator, to which the same identity is still being presented from the EID highways and upon detecting this coincidence of identity the calling number comparator applies a "yes" output signal over its output lead 134 to the common exchange P wire and hence to the common line state discriminator unit from where it is returned as a busy signal over the busy state-of-line data highway. Thus when this identity is scanned during successive scanning cycles of the master scanner a corresponding busy pulse will appear on the busy SOL highway which marks the calling extension identity busy to all other service units in the exchange. Subsequent to the transmission of the Read 1 signal from the common sequencer unit, the master scanner is restarted on its Stop 2 scan, as previously described, but fails to find a Stop 2 signal since no data is yet entered into the called extension identity store of the register. Upon completion of the Stop 2 scan, the sequencer unit passes a release signal over the Release program highway and the master scanner then continues its normal scanning action. The release signal is ineffective at this time, however, since the register gate G15, is not yet conditioned to respond to the release signal. Also, as soon as the master scanner moves off the calling subscriber's identity, the gate G5 in the LSD unit is closed, removing the signal over the LST connecting lead and the Stop 1 highway to the sequencer unit and the allotter calling signal and the one-only allotter inhibit signal from the leads AC1 and OA1, resulting in removal of the start signal from the register alotter start lead ST1A, and the consequent removal of the register allot signal on lead 129 (FIG. 3). This register however continues to be marked busy to the register allotter for the holding time of the register by the signal applied over lead 136 and terminal RAIA. At the same time, the "one-only" allotter (FIG. 1) is rendered available for use on other calls.

Registration of the calling extension identity in the calling number store causes the switch SW5 to be set to the calling extension line and the register now sends dial tone to the calling extension who proceeds to dial the wanted number. It may be mentioned here that in a preferred arrangement the speech path switches are consituted by relay switching elements, the contacts of which are arranged in a delta formation to provide a single inlet multi-outlet switch as described more fully below with reference to FIG. 7 of the drawings, the arrangement being advantageous since the relays constituting the switch also provide the storage and comparator functions required for the data transfer system being described.

2. Register Transfer to Local Link Circuit (Extension to Extension Call).

Figure 4:
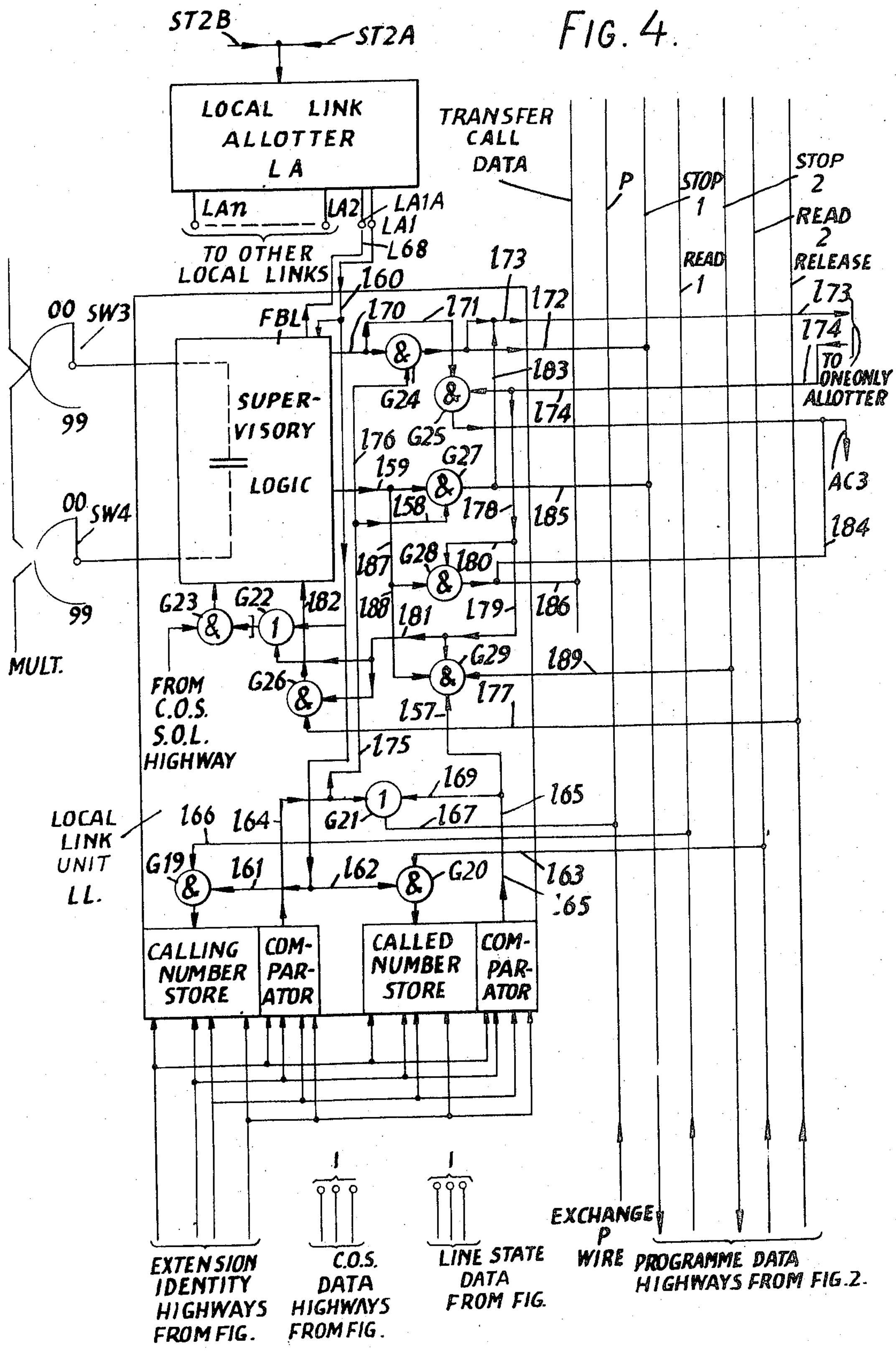

Referring now to FIGS. 3 and 4, together. FIG. 4 shows one of a group of service units, termed local links, provided to deal only with local, extension to extension calls. Each of these units has two separate switches one, SW3, for effecting connection to a calling extension line and one SW4, for effecting connection to a called extension line. As in the case of the register unit of FIG. 3, FIG. 4 shows only sufficient of the logic incorporated within a local line unit to enable the required data acceptance and transfer functions performed by the local line unit to be clearly described and understood. The detail logic for performing the normal functions of local call supervision, that is, providing the usual feeding bridge supervision, providing tones and ringing when required, and other discriminatory functions, described further below, may be of any well known form and is represented in FIG. 4 by the block FBL only.

As described in the previous section 1, a calling extension identity has been registered in the register of FIG. 3. Dial tone has been extended to the calling subscriber who is proceeding to dial the wanted number. As described earlier above for a local, extension to extension call, the calling subscriber dials three digits, the first of which is the prefix digit (2) which enables the register logic unit DPL to identify this call as a local call, while the second and third digits provide the numerical identity of the called extension line. When all the dialed information has been received, the register logic element DPL (FIG. 3) passes the called extension identity into the called number store by applying marking signals to a group of leads, of which only one, designated 138, is shown and which extend between the digit counting elements of the logic DPL and the storage elements in the called number store. At the same time, a signal is passed from the DPL logic element over lead 137, OR gate G10 and lead 142 to the one only allotter (FIG. 1) to request permission to use the program data highways. The one only allotter responds by returning a Go signal over lead 143 to indicate to the register that it may proceed. The signal on lead 143 is applied over leads 146, 147 and 154 to prime gate G16, and over leads 146, 147, 148, OR gate G11 to prime the group of gates G12. Other gates primed by the signal on lead 143 have no function at this time. Now, when the called extension identity next appears on the extension identity highways EID, the called number comparator responds to the coincidence of identity presented to it from the called number store and from the identity highways EID, by applying a Yes output signal over lead 135 to the gate G16 second input. Gate G16 operating applies a signal to the Stop 2 program highway over connecting lead 153. Referring to the sequencer unit in FIG. 1, it will be seen that the signal on the Stop 2 highway passes directly over leads 120, 112, OR gate G3, lead 126, gate G8, to the SEI connecting lead to inhibit the clock and stop the master scanner. The Stop 2 signal also passes over lead 119 to appear on the read 2 highway from the sequencer, but this signal is without effect at this time since no service unit has yet been allocated to receive it. The signal on lead 121 is also applied to the delay element SL2, and after a brief pause, a signal appears on lead 127 to inhibit gate G8 thereby removing the inhibit from the clock CK and allowing the master scanner to continue its normal scanning action. As a result of these actions, the data corresponding to the called extension identity has been staticised on the COS and SOL data highway for a period long enough to allow this data to be read into called extension data stores in the register DPL logic element. From the class-of-service and state-of-line data now recorded in the register DPL logic element, a logic decision can now be made regarding the further progress of the call. Thus, in a preferred arrangement, if the calling extension class-of-service is ordinary, i.e. is not entitled to make use of such special facilities as "Ring back when free" or "Executive break in", then irrespective of whether the called extension state of line is Free or Busy, the register would proceed to transfer the call to a local link unit, as described below, leaving the local link unit to take appropriate action in accordance with the COS and SOL data which the local link unit will itself read from the data highway. However, if the called extension SOL is busy and the calling extension COS is Executive then the register would hold the call and itself return busy tone to the calling extension line, so as to allow the executive to indicate, by dialing a further digit which of the special facilities he wishes to invoke. Again, should the called extension have an "N.U." class-of-service, or a Parked state-of-line then, irrespective of the calling extension class-of-service the register would hold the call and return the appropriate tone signal to the calling extension line.

When the register DPL logic element has registered the called extension COS and line state data, it removes the one-only allotter seize signal from the lead 137, thereby releasing the one-only allotter. For the purpose of this description we will assume that the logic decision made in DPL element is to transfer the call to a local link unit.

To effect call transfer to a local link unit, the DPL logic element applies signals to the lead 139 and 149 to prime gates G13 and G14, so that when the identity of the calling extension next appears on the identity highways EID, the calling number comparator in the register responds to the coincidence of identity presented to it from the register calling number store and from the identity highways EID, by applying a Yes output signal via leads 134 and 140 to operate the primed gate G13. Gate G13 operating applies an output signal over lead 141 and the Stop 1 highway, to stop the scanner, and over lead 142 to the one-only allotter (FIG. 1) to request permission to use the program data highways. The scanner, stopping, staticises the calling number identity on the highways EID. When the one-only allotter responds to the request signal on lead 142, it returns a Go signal over lead 143 to indicate to the register that it may proceed with the transfer operation. The signal on lead 143 passes via lead 144 to the second input to gate G14 which operates to pass an output signal over the allotter calling lead AC11, to the input of the local link unit allotter LA (FIG. 4), the signal passing via a strap in the programming terminal field STF (FIG. 1) and the local allotter start lead ST2A.

Referring to FIG. 4. The signal arriving over the allotter start lead ST2A causes the local link unit allotter LA to select the first free local link unit, which we will assume is the one connected to the allotter output terminal LA1 from which a signal is applied over lead 160, and 161, to prime gate G19 and over 160 and 162 to prime gate G20. The gate G19 now operates to the signal on the Read 1 program highway, applied from the sequencer unit (FIG. 2) in response to the arrival therein of the Stop 1 signal from the register unit. Gate G19 operating applies an energizing signal to cause the calling number store in the allotted local link unit to register the calling extension identity presented to it over the extension identity highways EID. The master scanner is now restarted on its Stop 2 scan. In the register (FIG. 3) the Go signal applied from the one only allotter, also passes over leads 143, 146, 147 and 154 to prime gate G16, so that when the master scanner reaches the scan position corresponding to the called subscriber identity, the called number comparator will respond, by applying a yes signal over lead 135 to operate gate G16 which applies a Stop 2 signal over lead 153 and the Stop 2 program highway to the common sequencer unit (FIG. 2). The sequencer unit responds, by again stopping the master scanner as previously described, thereby staticising the called extension identity on the EID highways and by applying a Read 2 signal to the Read 2 highway. In the local link unit allotted to this call (FIG. 4) the Read 2 signal is applied over lead 163 to operate gate G20, which, in the same way as described for the calling number store, causes the called number store to register the identity of the called extension presented to it from the EID highways. The local link switches SW3 and SW4 are set, by the registration of the calling and called extension identities in the calling and called number stores, to the respective calling and called extension lines, and the call proceeds under control of the supervisory logic element FBL. Meanwhile the supervisory unit, has allowed the master scanner to restart to complete the Read 2 scan, at the end of which it passes the release signal over the Release program highway. In the register of FIG. 3, this signal is applied over lead 152 to operate gate G15, which is already primed on its other input by the one-only allot signal applied to it over leads 143 and 146. Gate G15 operating applies an output signal over lead 151 whaich releases the register from this call. The register releasing, removes the allotter calling signals from the connecting leads AC11 and L42 thereby rendering the local link and one-only allotters available for use on other calls, the local link unit being marked busy to the local link allotter over lead 168 in the manner previously described for the register unit. Both the calling and called extension identities are now marked busy from the local link unit by Yes signals passed from the respective comparators over leads 164 or 165 and 169, OR gate G21 and its output lead 167 to the exchange P wire, the signals occurring each time the calling or called identity is scanned. Class-of-service and state-of-line data are read into the supervisory logic element FBL of the local link unit (FIG. 4) via the gates G22 and the common OR gate G23. These gates respond to the allot signal on lead 160 and to the signals on the appropriate ones of the COS and SOL data highways, the data being registered in the FBL supervisory unit while it is staticised on these highways during the registration of the calling and called extension identities in the calling and called number stores. Had the called extension been seen to be busy as a result of the registration of this data then the local link unit logic element FBL would take the appropriate action, sending busy tone to the calling extension as described earlier above.

3. Register Transfer to Exchange Line Unit (Outgoing Call to Main Exchange)

Referring to FIGS. 3 and 5 together, FIG. 5 shows an exchange line unit and the associated exchange line allotter EL. There is one exchange line unit for each trunk line provided between this PABX exchange and the local public exchange. As in the previous units described, FIG. 5 illustrates only sufficient of the logic, included within an exchange line unit, required to enable the data acceptance and transfer operations performed by the unit to be clearly described and understood. The discriminatory and supervisory logic provided for the through switching between an extension line and the associated trunk line and for the supervision of the call, etc., is assumed to be included in in the logic element indicated by the block SUL. The circuit includes only one number identity store with its associated comparator and has a single extension line access switch SW2.

We will assume that a calling extension identity has been recorded in the number store of a free register as described in section 1 above and that the calling extension is proceeding to dial an external exchange number. In this case, the prefix digit (9) dialed into the register causes the logic element DPL to detect that an external call, and hence an exchange line unit, is required. The register logic element DPL responds to this discrimination without awaiting receipt of any further dialed digits, by applying signals to the leads l39 and l55 to prime gates G13 and G17. Upon receipt of the next yes output from the calling number comparator, the gate G13 operates to apply a Stop 1, signal to the Stop 1 program highway over lead L41 and a request signal over lead l42 to the one-only allotter, as previously described (section 2) above. The Go signal arriving from the one-only allotter over lead l43 passes via leads l44 and l45 to the primed gate G17, which operates to pass a signal over the allotter calling lead AC12, this connecting lead being one which extends via the programming terminal field STF and the Exchange line allotter (EL) start lead ST3A (FIG. 5).

Referring to FIG. 5, we will assume that in response to the signal received on its input start lead ST3A, the allotter EL has allotted the exchange line unit of FIG. 5 by the application of a signal to its output terminal EL1. This signal passes over the lead l90 to prime gate G30, which operates in response to receipt of the Read 1, signal from the common sequencer unit, there being no inhibiting signal present on the lead l92 at this time. The gate G30 operating causes the calling extension identity, staticised on the EID highways to be registered in the exchange line unit number store. The corresponding yes output signal from the comparator passes via leads l101, l102, and l103 to operate gate G38, there being no inhibiting signal present on lead l104 at this time. Gate G38 passes a busying signal over its output lead l105 to the exchange P wire to maintain the calling extension busy SOL. Registration of the calling number identity in the exchange line unit number store results in the switch SW2 being set to the calling extension line, so that this line now becomes extended through to the trunk line to the main public exchange, over which subsequent impulse trains, dialed by the calling extension, pass, and the call proceeds in well known manner under control of the logic element SUL. Meanwhile, as previously described, the master scanner is restarted to look for a Stop 2 signal but fails to find one and at the end of its Stop 2 scan sends a release signal over the Release program highway, which as described in section 2 above takes effect in the register and brings about its release.

4 (a) Enquiry Call

Referring to FIGS. 3, 4 and 5 together, this is the case where an extension engaged on an external call, for example, as in section 3 above, wishes to make an internal enquiry call, the external trunk being held so that the extension can return to the external call upon the termination of the enquiry.

To initiate the enquiry call, the extension operates the line earthing push button on his telephone instrument to signal the exchange line unit to which he is connected that he requires the services of a register unit. In the exchange line unit (FIG. 5) the supervisory logic element SUL responds to the earth line signal by applying a first output signal which passes over lead l106 to prime gate G39 and over leads l106 and l107 to prime gate G40, and a second output signal which passes over leads l91, l93 and l95 to prime gate G36, and over leads l91 and l92 to inhibit gate G30. When the calling extension identity next appears on the extension identity highways EID, the yes output signal from the comparator associated with the exchange line unit number store, passes over leads l101, l102 and l108, to operate gate G39, and over lead l101 to operate gate G36. The gate G36 accordingly applies a marking over a lead l114 to terminal ELM1 of the exchange line allotter, for the purpose described below. The gate G39 passes an output signal over lead l109 and the Stop 1 highway to stop the master scanner on the calling extension identity, and over lead l110 to the one-only allotter responds to the signal on lead l110 by returning to a Go signal over lead l111, which operates gate G40. The output signal from G40 passes over the allotter calling lead AC4 which extends via the programming terminal field ST4 and the register allotter start lead ST1B (FIG. 3). We will assume that the register unit shown in FIG. 3 is allotted for use on this call by an allot signal which passes from the register allotter output terminal RA1, via lead l29 to prime gate G9. As previously described this gate operates to the Read 1 signal applied, from the sequencer unit consequent upon the receipt of the Stop 1 signal thereat, over the Read 1 program highway and lead l32. Gate G9 operating causes the calling extension identity, staticised on the EID highways to be read into the register calling number store. In the manner previously described, the master scanner now executes its Stop 2 scan, but fails to find a Stop 2 signal and at the end of this scan applies a release signal to the Release program highway. In the exchange line unit (FIG. 5), the gate G37, which was primed by the Go signal on lead l111, now operates to the release signal applied to it from the Release program highway and the connecting lead l112, to pass an output signal over lead l113 to the supervisory logic element SUL, causing the element to interrupt the through path between the calling extension line and the external exchange line and to hold the exchange line in well known manner. In the register unit (FIG. 3), consequent upon the registration of the calling extension identity in the calling number store, the coupling switch SW5 is set to the calling extension line and the calling extension now dials the number of the wanted extension exactly as though he were setting an ordinary local call and the register unit responds by effecting transfer to a local link as described in section 2 above for a local extension to extension call, the register being released upon completion of the transfer operation. Conversation can now ensue between the calling and called extensions.

At the termination of the enquiry call the calling extension again depresses the line earthing button on his telephone instrument to signal the local link unit (FIG. 4) that he now wishes to return to his external call. This earthed line signal takes effect in the local link supervisory element FBL causing it to apply a signal over lead 170 to prime gate G24 and over leads 179 and 171 to prime gate G25. When the calling extensions identity again appears on the identity highways EID, the comparator associated with the local link unit calling number store passes a yes output signal over leads 164, 175 and 176 to operate gate G24, from whose output a signal is passed over lead 172 and the Stop 1 highway to stop the master scanner and over lead 173 to the one-only allotter, which responds, as previously described, to return a Go signal over lead 174. The Go signal on lead 174 operates gate G25, from whose output a signal is passed over the allotter calling lead AC3 which extends via the programming terminal field STF and the exchange line allotter start lead ST3B (FIG. 5), the input being one which indicates to the exchange line allotter that this is a returning call and that it must allot the correct exchange line unit previously indicated to is by the marking signal applied over the marking lead 1114 and the corresponding marking terminal ELM1, as described above. The exchange line allotter is provided with one marking terminal such as ELM1 for each of the exchange line units in the group served by this allotter. In this way the exchange line allotter upon receipt of the signal on its start lead ST3B sets itself to re-allot the exchange line unit dealing with this call. The allot signal passes over leads 190, 1100 and 199 to one input to gate G32 and this gate is operated by the Read 1 signal which appears on the Read 1 program highway consequent upon the Stop 1 signal, transmitted from the local link unit. The output signal from gate G32 passes over lead 197 to the supervisory element SUL and serves to restore this element to its normal mode whereby the through path between the calling extension and the exchange line is re-established in the talking condition. In the manner previously described, the master scanner executes a Stop 2 scan without encountering a Stop 2 signal and sends a release signal over the Release highway. In the local link unit (FIG. 4). the release signal passes over lead 177 to operate gate G26, this gate being primed on its other input by the Go signal from the one-only allotter, applied over leads 174, 178, 179 and 181. The gate G26 operating applies a releasing signal over lead 182 to release the local link unit. The local link unit releasing, removes the allotter calling signal from the allotter calling lead AC3 and from the exchange line allotter calling lead AC3 and from the exchange line allotter start lead ST313, thereby releasing the allotter for use on other calls. The allotter position corresponding to the exchange line unit is marked busy over connecting lead 1127 and the exchange line allotter terminal EL1A, in the manner above described for the local link and register units.

4 (b) Transfer Call

This type of call is similar to the enquiry call described in 4 (a) above, except that upon the termination of the local connection, the calling extension clears down from the call, leaving the called extension to return to the original external call. For this type of call, an additional highway, termed the Transfer Highway is provided. This highway extends between the local link units and the exchange line units and connections to this highway are made from each of the local and exchange units in the same way as indicated for the local link and Exchange line units shown in FIGS. 4 and 5, respectively.

The circuit operation, involving FIGS. 3, 4 and 5, for this type of call is the same as that described in section 4 (a) above up to the point where the enquiry call has terminated. In this case, to transfer the called extension to the original external call, the calling extension simply clears down. In the local link unit (FIG. 4) over which the enquiry connection was established, the calling subscriber clear down signal causes the local link supervisory logic FBL, to apply a transfer signal on its output lead 159 to prime gates G27, G28 and G29, the transfer signal passing to the latter gates via leads 187 and 188. The orignial calling extension identity is still retained within the local link calling number store, and when this identity next appears on the identity highways EID, the calling number comparator produces a yes signal which passes via leads 164, 175 and 158 to operate gate G27, from whose output a Stop 1 signal is extended over lead 185 and the Stop 1 program highway to stop the master scanner. The G27 output signal also passes over leads 183 and 173 to the one-only allotter which responds by returning a Go signal which passes over leads L74, 178 and 180 to operate gate G28 and over leads 174, 178 and 179 to the second input to gate G29. Gate G28, operating applies a signal to the transfer highway over lead 186 and also applies a signal over lead 184 to the allotter calling lead AC3 to mark the exchange line allotter in the enquiry mode to cause the exchange line allotter (FIG. 5) to allot the correct exchange line unit, as described in section 4 (a) above. In the exchange line unit from which the enquiry call originated, the allot signal on lead 190 passes via lead 1115 to one input to gate G33, to whose second input the signal on the transfer highway is extended over lead 1116. Gate G33 thus operates to apply an operating signal to gate G35 which is primed on its other input from the enquiry mode signal extended from the supervisory logic element SUL over leads 191, 193 and 194. Gate G35 operating applies a signal to clear the calling extension identity from the calling number store. The Read 1 signal which appears on the Read 1 highway consequent upon the application of the Stop 1 signal from the local line unit, is applied over lead 1125 to operate gate G32, gate G30 being inhibited at this time. Gate G32 operating applies a signal over lead 197 to the supervisory logic element SUL, this signal being effective to cancel the enquiry condition of the supervisory logic element, thereby causing the signal on lead 191, etc. to be removed, the restoration of gate G35 and the removal of the resetting signal to the number store. The master scanner now commences its Stop 2 scan. In the local link unit (FIG. 4) when the called extension identity appears on the identity highways EID, the called store comparator produces a yes output signal which passes over leads 165 and 157 to operate gate G29, from whose output, a Stop 2 signal is applied to the Stop 2 highway over lead 189. In the exchange line unit (FIG. 5), the Read 2 signal which now appears on the Read 2 program highway passes over lead 1117 to operate gate G34. The output signal from gate G34 is applied over lead 1118 to cause the called extension identity, staticised on the identity highways EID, to be registered in the exchange line unit number store, and the coupling switch SW2 is thereby set to the called extension line, thereby establishing the through path between the called extension and the exchange line. Meanwhile, the master scanner scans on and at the end of the Stop 2 scan, sends a release signal, which releases the local link unit as described in section 4 (a) above.

5 (a) Incoming Exchange Line to Extension Call

Again referring to FIG. 5, as in normal PABX practice, external calls incoming to the PABX are initially answered by the PABX operator. In FIG. 5, an operator's cabinet OC and an associated operator's register OR are indicated in block schematic form only, since the operator's cabinet can have any well known form, while the operator's register is substantially the same as the ordinary service unit register shown in FIG. 3 of the drawings, differing mainly in that the operator's register is directly connected to the operator's cabinet and does not include the line coupling switch SW5 shown in FIG. 3.

In FIG. 5, the occurrence of an incoming call over an external exchange line, is recognized by the supervisory logic element SUL, which in response thereto, applies an answering loop to the exchange line and applies a calling signal over lead l119 to cause a lamp, on the operator's cabinet, corresponding to the calling exchange line, to flash. In addition the logic element SUL applies a signal over lead l121 to mark this exchange line unit to the exchange the allotter. This is necessary to ensure that subsequent transfer of data from the operator's register is made to the correct exchange line unit. The operator answers the call by operating a key, indicated, in explanatory schematic form, as switch contact KE, corresponding to the flashing lamp signal. The operator's cabinet is similarly connected to all the exchange line units so that there is one lamp and one key for each exchange line linking the PABX to the distant public exchange. Operation of the key KE causes a conversational path, indicated by lead L120 to be extended from the cabinet to the calling exchange line. The operator now talks to the caller to ascertain the identity of the required PABX extension whereupon she keys this number into the associated operator's register. The operator's register now functions in substantially the same manner as an ordinary register involved in an outgoing exchange line call, as described in section 3, above. That is, the operator's register applies a Stop 1 signal to stop the master scanner on the wanted extension identity, applies to the one-only allotter to request permission to effect a data transfer and upon receipt of the one-only allotter Go signal, applies a signal over the allotter calling lead OCA which extends between the operator's register and the exchange line allotter via the programming terminal field and the exchange line allotter start lead ST3C, this input being one which causes the allotter to allot the exchange line unit indicated to it by the marking signal applied to the marking terminal OPM1, over lead L121, described above. The exchange line unit then accepts the information presented to it on the data highways. The line coupling switch SW2 is set to the called extension to whom ringing is extended in the normal manner and the call proceeds under the supervision of the logic element SUL, operating in its incoming mode. Meanwhile in the manner previously described for the ordinary register, the operator's register is released.

5 (b) Incoming Call Camping on Extension

We will assume that, in the setting up of the incoming call described in section 5 (a) above, upon the transfer of the called extension identity to the exchange line unit, the operator receives a signal indicating that the called extension is busy. It is to be understood that although not shown, the circuit of FIG. 5, also includes gating means similar to the gates G12 described above with reference to FIG. 3 of the drawings, for gating the class-of-service and line state data into the supervisory logic element SUL (FIG. 5). The operator can now inform the caller that the wanted extension is busy and ask him if he wishes to hold on until the wanted extension becomes free. If the caller wishes to hold on, the operator simply restores her key KE to disconnect the operator's speech path. In the exchange line unit, under this called extension busy condition, the supervisory logic applies a signal over lead l122 to one input to gate G41, whose second input is connected to the comparator output over leads L101, l102, and l124 and whose third input is directly connected to the Free line state data highway. The signal on lead l122, is also applied over lead l104 to inhibit gate G38, which would otherwise provide a busy signal, corresponding to the stored identity on the exchange P wire. The gate G41 now monitors the called extension identity against the Free state-of-line so that when this extension becomes free, then upon the next appearance of its identity on the extension identity highways EID, the gate G41 operates to apply a Stop 1 signal over lead l123 and the Stop 1 highway to stop the master scanner. As a result, the data corresponding to the called extension identity is staticised on the various data highways, and the supervisory logic element responds to the staticised Free state of line signal to change state from the busy to the free condition, resulting in the cancellation of the lamp-on signal on lead l122, and the application of ringing to the called extension line.

6. Ring Back Call

This is the case where an executive, attempting to establish a local, extension to extension call has dialed the called extension number into a register, as described with reference to FIG. 3, in section 1 above, and has encountered busy. It will be appreciated that in this situation, the executive could readily be given the option of direct intrusion into the busy connection, but for the purpose of this description we will assume that he elects to transfer the call to a ring back service unit as shown in FIG. 6 of the drawings.

The function of the ring back unit is to record the identity of both the calling and called extensions and to monitor there against the Free state-of-line data, the circuit being arranged to apply ringing to the calling extension line when both extensions are seen to be free and upon the calling extension reply, to transfer the call to a local link unit for completion as described in section 2 above. Meanwhile, the calling executive extension is free to make and receive further calls.

Referring firstly to the register unit of FIG. 3, we will assume that this unit has registered the calling and called number identities as described in sections 1 and 2 above, but the called number being engaged and the calling COS being Executive, the register logic element DPL has returned busy tone as previously described. To effect transfer to a ring-back unit, the executive now dials a further special digit, e.g. the digit 4, in response to which and the executive COS applied to it from the appropriate gate G12, the register logic element applies a signal over lead l50 to gate G18 which operates in response to the Go signal from the one-only allotter. Gate G18 operating applies a signal over the allotter calling lead AC13, the programming terminal field STF and the ring back allotter start lead ST4 (FIG. 6). The register unit now performs a data transfer in respect of both the calling and called identities as described in section 2 above. In the allotted ring back unit (FIG. 6), the calling and called identities are registered in the respective calling and called number stores, by the operation of gates G42 and G43, in response to the sequence of Read 1 and Read 2 signals applied to the gates from the respective Read highways over the leads l131 and l132, and the presence of the allot signal on lead l130. At the same time the COS and the line state data are applied to the logic element by gating, such as G12 (FIG. 3), not shown in FIG. 6. In response to the Busy line state signals, the ring-back logic element is set into its busy mode, resulting in the application of a signal to lead l133 to inhibit the gate G50 from applying busy marking signals to the exhange P wire in respect of this unit. The gates G45 and G46 now monitor the calling and called number identities against the Free line state signals on the free line state data highway to which one input to each of these gates is connected, the other input to each gate being connected to the calling and called comparator outputs, respectively. The outputs from the gates G45 and G46 are connected to storage means in the ring-back logic element RBL, as indicated schematically by the dotted rectangle, the arrangement being such that if one identity is free when scanned, the corresponding storage element is set until the other identity is scanned, whereupon if the other identity is still busy, then the first storage element is reset. This action continues until both identities are free, when the gates G45 and G46 both operate in the course of a single scanning cycle. When both stores are set, a signal is applied to one input to gate G49, which operates in response to the yes output signal from the calling comparator to apply a Stop 1 signal to stop the master scanner. As described in section 5(b) above, this staticises the data appearing on the data highways in respect of the calling extension identity, enabling the ring back logic element to change state from the Busy to the Free line condition, with the result that ringing is applied to the calling extension while the signal previously applied to the lead l133 is terminated, thereby removing the inhibition from gate G50.

(It may be noted, here, that the application of a Stop 1 signal without application to any of the allotters is effective only in allowing the sending unit to read staticised data into itself. Since no other unit is allotted, no transfer of information occurs and the subsequent appearance of the Read 1 signal has no effect since the sending unit is already storing the identity staticised on the identity highways. The subsequently occurring release signal is also without effect since the release gate G47 is not primed at this time.)

Upon the resumption of scanning, the gate G50 responds to the yes outputs from both comparators, applied via OR gate G44, thereby marking both extensions busy on the exchange P wire. In this way the called extension is effectively reserved for this call. When the calling extension answers, this is detected by the ring back logic element which now applies a signal over lead l136 to operate gate G52 and to prime gate G51. The ring back unit now performs a transfer operation in respect of the calling and called identities to a local link circuit, the gate G52 sending the Stop 1 signal upon the next appearance of the calling extension identity and applying to the one-only allotter in the manner previously described. The gate G51 operates in response to the Go signal from the one-only alotter and applies a signal over the allotter calling link AC4, the programming terminal field STF and the local line allotter start lead ST2B (FIG. 4). Similarly the Stop 2 signal is applied from the gate G48 when the called extension identity is scanned, and the subsequent release signal operates the release gate G47 thereby restoring the ring-back unit to normal. The ring-back call now proceeds as an ordinary local call under control of the allotted local link unit.

It will be appreciated that by the use of the data transfer arrangements of the present invention a considerable break through in the design of small PABX telephone exchange systems has been achieved. The selection of different types of call connection described above illustrate the extreme flexibility conferred by this method of data transfer so that the number and variety of different facilities rendered possible by these arrangements is virtually unlimited.

Furthermore, the arrangements described enable a very economic comprise to be made between the use of high speed electronic logic, desirable for the master scanner and the highway TDM signal responsive elements, and the speech path supervisory and associated logic elements which operate, generally, with signalling rates which are several orders slower than the highway TDM signalling rates and for which relatively slow speed relay type logic is suited. Thus in a preferred arrangement of the PABX system described above, the line coupling switches and the identity stores, with which the comparator function is incorporated, as well as the speech path supervisory logic, all comprise miniature multicontact industrial type relays which are robust, reliable and relatively simple and economical in manufacture. However, it is to be understood that the invention is in no way limited to a hybrid arrangement of this kind and indeed it is visualised that, should the economic balance swing in favour of electronic, integrated circuit components, as against electromagnetic relays, then the system as described above could very readily be adapted to become fully electronic. In such a fully electronic system the need to step the scanner in order to staticize data on the data highways of the system would clearly be unnecessary, since the electronic circuitry could then be made fast, relative to the scanning rate, so that a data transfer operation could then be effected within the time period of a single scanner step.

FIG. 7 of the drawings shows the preferred arrangement of a combined line coupling switch, identity store and comparator element, using multicontact relays of the kind described above, together with a few simple electronic gating elements. For this element, the master scanner output codes are arranged on a quinary decimal basis, the units codes being arranged together with first and second pairing signals to represent the digits 1–5 and 6–10 respectively, while the tens values are represented on a simple one out of 10 code basis. The units values are marked over six identity highways designated E, EE, X, B, C and D respectively. The highways X, B, C and D, provide for quinary code signalling on a two out of four basis, which provides five unambiguous codes, XB, XC, XD, BC and CD. It will be noted that the "X" highway merely provides a parity signal to avoid the ambiguity which would otherwise arise if the B, C, and D highways were used to provide individual signal codes. The highways E and EE carry the first and second pairing signals, a first pairing signal on highway E indicates the odd multiples of five while a signal on the highway EE indicates the even multiples of five. For the tens digit values, 10 highways designated AA1 and AA10 inclusive are provided. In FIG. 7 only the highways AA1 and AA10 are shown in full, the highway AA2 to AA9, being connected in an exactly similar manner. For storing the units identity value, three relays designated SB, SC and SD, are provided while for storing the tens digit there are 20 relays, of which only four, designated A1, A10, A11 and A20 are shown, the relays A2 to A9 inclusive being connected in an exactly similar manner to that shown for the relays A1 and A10, while the relays A12 to A19 inclusive are connected in an exactly similar manner to that shown for the relays A11 and A20. Each tens digit highway is associated with one relay in each of the two relay groups A1 to A10 and A11 to A20 and when operated, these relays designate the odd and even quinary multiples respectively. Contacts of the tens and units relays provide both the line coupling switch and comparator functions. The line coupling switch is shown at the top of FIG. 7, and comprises a relay contact array, arranged, as further described below, to connect each of the +ve and −ve speech path conductors shown incoming, on the right hand side of the drawing, from an associated service unit of the exhange, to the +ve and −ve conductors of any one of 100 extension lines, indicated as outgoing from the left hand side of the drawing. The relay contact array consists of contacts of the units relays SB, SC and SD arranged in two delta formation groups associated respectively with the incoming +ve and −ve speech path conductors, and serving to connect these conductors respectively to any one of two groups of five second rank common points BC, there being two ranks of commoning AC and BC as shown in FIG. 7. Each of the relays A1–A20 has 12 make contacts, 10 of which serve to connect the +ve and −ve wires of five extension lines to the respective ones of the first rank commons AC, as shown for relay A1 in FIG. 7. The second rank commons BC give access to four sets of the commons AC, and each set of AC commons is associated with the contacts of five A relays. Thus each set of AC commons serves 25 extension lines and the four sets of AC commons, commoned at BC give access to a total of 100 extension lines. This arrangement has the advantage that the line capacity of the switch can readily be varied from a minimum of 25 lines using only five A relays in steps of 25 lines to the maximum 100 line capacity. The comparator function is provided, on the units side by the units relay contacts SB2, SC2, SD2 and SD3, and on the tens side by the contacts A1/12–A20/12, inclusive, the tens and units comparisons being combined by the "Nand" gate SG3, from whose output the comparator YES signal is applied to the output lead CO. The circuit of FIG. 7 operates as follows.

We will assume that in the operation of the exchange described avove, a stop signl has arrested the scanning action of the master scanner and that consequently an extension number identify has been staticised on the tens and units highways in FIG. 7. Subsequent to the stop signal, a Read signal occurs, which is extended via a gate, which operates in the presence of an Allot signal, as previously described, for example, with reference to FIG. 3 of the drawings, to apply an energizing signal to the number store. In FIG. 7, this energizing signal is an earth signal applied to the lead M shown incoming on the right hand side of the drawing. This signal is applied to one input to each of the gates SG1 and SG2. We will also assume that the staticised identity marked over the identity highways represents the extension line number 3. In this case the units highways E, X, and D and the tens highway AA1 will each carry earth potential signals, the remaining highways being at their normal +ve potential. The gates SG1 and SG2 each have a second input connected to the second pairing highway EE, and in the absence of a signal on this highway, the gate SG1 operates to apply a positive output signal to the odd fives group of relays A1–A10. However, since only the tens highway AA1 is at earth potential, relay A1 alone is operated. Relay A1 operating, at its contsct A1/1 to A1/10 connects the five extension lines 1–5 through to the common points AC/BC, at its contacts A1/11 completes a resistive battery holding circuit for itself, independent of the highway AA1 and at contacts A1/12 connects the highway AA1 to one input to gate SG5 to whose second input the earth signal on lead E is applied. Gate SG5 operates to apply the earth signal on highway AA, via OR gate SG4 to one input to the Nand gate SG3. Similarly on the units side the positive output signal from the gate SG1 is applied over rectifier DD3 to the units relays SB, Sc and SD, but since earth potential is present only on the D highway of the three highways to which these relays are connected, only relay SD operates. Relay SD operating, at contacts SD1 completes a resistive battery holding circuit for itself, at contacts SD2 connects the D units highway to the third input to the gate SG3. Contact SD3 changes over, but since no other units relay is operated, this change over is without effect and the X highway remains connected through to the second input to gate SG3. Contacts SD4 and SD5 changing over connect the +ve and −ve speech path wires over unoperated contacts of the relays SC and SB to the extension line wires +3 and −3 respectively. The gate SG3 operates in response to the coincidence of the three earth signals applied inputs and applies a +ve yes output signal over the lead CO. The switching of the looped extension line through to the supervisory logic element of the associated service unit causes the operation therein of a holding (B) relay which applies an earth holding potential to the lead H shown incoming to FIG. 7 and this holds the operated relays A1 and SD in the resistive battery holding circuits completed by their respective contacts A1/11 and SD1. It will be noted that the comparator function is effected by causing contacts of the operated ones of the storage relays to switch a particular combination of the tens and units identity highways through to the Nand gate SG3, whose output will be high only when each of its three inputs is low. Had the identity staticised on the identity highways represented extension line number 10, for example, then in this case the highways AA1, EE, C and D would carry earth potential signals and the relays operated would be relay All, operated via gate SG2 which is energized by the earth signal on highway EE, together with relays SC and SD. The relay All operating connects the second group of five extension lines 6–10 (not shown) through to the AC/BC commons while the units relays SC and SD, at contacts SD4 and SC4, and SD5 and SC6 connect the +*ve* and −*ve* speech wires through to the extension line wires +10 and −10 respectively. Also at contact All/12 the tens highway AA1 is connected to one input to the gate SG3 via gates SG6 and SG4, while on the units side, the C highway is connected over operated contacts SC2 and SD3 to the second input, while the D highway is connected over contact SD2, operated, to the third input to gate SG3, which consequently operates to produce the Yes output signal. which is also applied to the P wire. The outputs of all comparators are connected to the common P wire, and, as will be appreciated, in some cases the outputs may be directly connected to the P wire. In some cases, however, the supervisory logic of the service unit may be arranged to inhibit the output from the comparator to the P wire, for example when the switch connection is performing a solely supervisory function to transmit a ringing signal or return an engaged tone, and no speech path is established.

Although the PABX system described above has evolved about a small 25 to 100 line unit, it is contemplated that larger exchange systems could be devised by, in effect coupling a number of 100 line units together. For such an arrangement, although identity stores and highways would be provided in the manner described above they would no longer be directly associated with the supervisory links, at least some of which would need to be placed outside and between the 100 line units necessitating further control highways between the external supervisory links and the storage located within the switching units. It is believed that with such arrangements exchanges with capacities of 1000 lines or more could be devised.

What we claim is:

1. An automatic telephone exchange system comprising:

means for generating cyclically and successively the addresses of telephone lines of said exchange in coded form, a plurality of functionally different apparatus units, including telephone lines connecting units, each of said functionally different apparatus units including a store for storing a coded address generated by said generating means, said generating means being connected to the stores of all said apparatus units in order to present the generated address simultaneously thereto, and including a comparator for detecting coincidence between the address stored in said apparatus unit and an address presented thereto;

control means for causing the address of one of said telephone lines to be initially stored in the store of one of said apparatus units; and means for transferring the address stored in said one apparatus unit to another apparatus unit, said address transferring means including means operable when the comparator of said one apparatus unit detects coincidence between the address being generated and the address stored by said one apparatus unit for enabling a store of said other unit to receive the address then generated.

2. An automatic telephone exchange system as claimed in claim 1, in which at least some of said apparatus units have a plurality of stores for addresses, all of which are connected to said address generating means, the said address transferring means includes a sequencing unit common to all of said apparatus units for so programming the transfer of addresses from one unit to another that addresses from said stores of one unit are transferred consecutively to the corresponding stores of the other unit in a single transferring process in which the said enabling means operates consecutively a number of times corresponding to the number of stores, upon the detection of coincidence between the address generated and the address in each consecutive store of the one unit, to enable the stores of the other unit consecutively to receive addresses from the address generating means, and means is provided for preventing initiation of a transferring operation by one apparatus unit until any such operation initiated by another unit has ueen completed.

3. An automatic telephone exchange system as claimed in claim 2, in which said apparatus units are divided into a plurality of functionally different groups of one or more individual units, the individual units within any given group being arranged to perform the same function, and in which there are provided allotting means linking each said group of individual units, and arranged to select a single free unit of the group for address receiving at each initial address storing operation or each address transferring operation.

4. An automatic telephone exchange system as claimed in claim 3, in which one of said functionally different apparatus units, or each unit of one of said groups of units, is a register unit with two stores for receiving calling and called line addresses respectively and with means for establishing a switched connection with the line identified by an address in at least the first one of said stores, the remaining functionally different units, including said telephone line connecting units, being arranged to perform functions ancillary to that of the register unit and to receive data from the latter and/or to transfer data between themselves; in which said generating means including a scanner scanning said telephone lines in synchronism with the presentation of said addresses to said apparatus units; in which said control means causes the address of a calling line encountered by said scanner to be entered in the first store of said register unit; and in which said register unit includes means for entering in the second store of the register unit dialed digits identifying the address of a called line and received via a line identified by the address entered in said first store.

5. An automatic telephone exchange system as claimed in claim 4, in which one of said telephone line connecting units, or each unit of one of said groups of telephone line connecting units, comprises an external exchange unit linked to an outgoing line from the automatic exchange and including a single store to receive the address, as the case may be, either of a calling line by way of data transferred from said register unit, or of a line called, by way of data transferred from a store of a further one of said functionally different units in which store the called line address may be entered directly in response to an incoming call from the external exchange, said exchange unit further including means for establishing a switched connection between said outgoing line and the line identified by the address in its store.

6. An automatic telephone exchange system as claimed in claim 5, in which a further one of said telephone line connecting units, or each unit of a further one of said groups of telephone line connecting units, comprises a local link unit including two stores for receiving a calling line address and a called line address respectively, the local link unit including means for establishing switched connections with the lines identified by the addresses in each of its stores, and the arrangement being such that upon entry of line addresses in the first and second stores of the register unit respectively this data is transferred to the stores of the local limb unit by said transferring process.

7. An automatic telephone exchange system as claimed in claim 6, in which the said register unit comprises means, responsive to a digit initially dialed from a calling line identified by the address in its first store, for determining whether data is to be transferred from the register unit to an external exchange unit or to a loca link unit, the arrangement being such that in the former case the data transferring process is initiated immediately following receipt of the initial dialed digit, whilst in the latter case the data transferring process is initiated after entry in the second store of the register unit of subsequently dialed digits received via the calling line.

8. An automatic telephone exchange system as claimed in claim 4, further including, synchronized to said telephone line address generator, means for generating data indicating a class of service apertaining to each telephone line address generated, each or at least some of said functionally different units or groups of units including, associated with each store thereof, logic circuits for receiving, either during a data transfer process or upon coincidence between an address entered in said store and the address generated by said address generator, class of service data corresponding to the telephone line address entered in said store, said logic circuits being arranged to control the functions of said unit in accordance with the data received.

9. An automatic telephone exchange system as claimed in claim 8, further including, synchronized to said telephone line address generator, means for discriminating the line state of each address generated, each or at least some of said functionally different units or groups of units including, associated with each store thereof, other logic circuits for receiving, either during a data transfer process or upon coincidence between an address entered in said store and the address generated by said address generator, line state data corresponding to the telephone line address entered in said store, said other logic circuits being arranged to control the functions of said unit in accordance with the data received.

10. An automatic telephone exchange system as claimed in claim 9, in which the or each said register unit includes logic circuitry responsive to class of service data received in respect of a calling line address entered in the first store for so limiting data transfer process that data transfer from the register unit can only proceed to such of said functionally different units as correspond to that class of service.

11. An automatic telephone exchange system as claimed in claim 10 in which a further one of said functionally different units, or each unit of a further one of said groups, comprises a ring back unit comprising two stores for receiving respectively a calling line address and a called line address, said ring back unit including other logic circuitry responsive to line state data indicating a free condition of both of the telephone line addresses entered in said stores for initiating a data transfer of said addresses to a local link unit, and the logic circuitry of the or each said register unit being responsive to line state data indicating a busy condition of a telephone line address entered in said second store, for inhibiting the data transfer to a local link unit, for returning a busy signal to the calling line, and for initiating a data transfer operation from the register unit to a ring back unit in response to a command from the calling line.

12. An automatic telephone exchange system as claimed in claim 11, in which the or each register unit also includes further logic circuitry, responsive to a combination of line state data indicating a busy condition of a telephone line address entered in said second store and of class of service data indicating that the called line is barred from use of the ring back unit, for initiating a data transfer process directly to a local link unit without returning a busy signal to the calling line.

13. An automatic telephone exchange system as claimed in claim 6, in which the or each exchange unit includes means, responsive to a signal from the telephone line identified by the address entered in its store, for initiating a data transfer of this address to the first store of said register unit, whilst remaining in the busy condition, to enable a further data transfer to a local link unit following entry in the second store of the register unit of an address identified by digits dialed from the line identified by the address in its first store, and the or each local link unit further includes means, responsive to a signal from the line identified by the address in its first store for initiating a data transfer process between its first store and the store of said exchange unit to reestablish the link between the line identified by said address in its first store and the said exchange unit.

14. An automatic telephone exchange system as claimed in claim 13, in which the or each local line unit further includes means, responsive to a signal from the line identified by the address in its first store, for initiating a data transfer process between its second store and the store of said exchange unit in order to establish a link between the line identified by the address in said second store and the exchange unit.

15. An automatic telephone exchange system as claimed in claim 14, and including a plurality of exchange units in a group, in which the said allotting means associated with the group of exchange units are so arranged to cooperate with the logic circuits of a local link unit to which an address is transferred, that during the subsequent data transfer process the allotting means reallots the exchange unit from which the initial data transfer process originated.

16. An automatic telephone exchange system of the type providing for selective interconnection of a plurality of telephone lines in response to dialing signals sent over a calling one of said lines, said system comprising common control logic including means for generating cyclically and successively the addresses of the telephone lines served by the exchange, and comprising a plurality of separate functional units each including switch means for establishing two wire speech path switching to said telephone lines, a store associated with each switch means and providing, independently of the conductive path of the switch means, a memory for storing the address, presented by said generating means, of a telephone line with which a connection is established by said switch means, and a comparator for producing an output signal on coincidence between a line address generated and an address contained in said store, the arrangement being such that the combination of all of said stores provides a composite memory storing the addresses of the telephone lines served by the exchange at any given time and capable of being interrogated by said common control logic on a time division multiplex basis defined by said address generating means, whilst continuous speech paths are established by said switch means.

17. An automatic telephone exchange system as claimed in claim 16, in which said exchange, in addition to said common control logic which serves to program the operation of said functional units, comprises logic circuits associated with and individual to said functional units, each comparator providing an output to the logic circuits of its functional unit and all the comparators providing a common output, if necessary by way of the logic circuits of the associated functional units, to the common control logic of the exchange.

18. An automatic telephone exchange system as claimed in claim 17, in which line gate means are connected with the subscriber line terminals of the exchange; in which said generating means includes a scanning means, which, in synchronism with the presentation of said addresses to said stores, cyclically and successively scans said gate means to cause said line gate means to produce an output signal in response to detection of a line looped or "off hook" condition of a subscriber telephone apparatus connected to said terminals; and in which said common control logic also includes a line state discriminating means connected respectively to the output of said line gate means and to said common output of said comparators, said line state discriminating means being arranged to derive from the input signals thereto output signals indicative of the line state of subscriber line terminals scanned at any given time.

19. An automatic telephone exchange system as claimed in claim 18, in which said line state discriminating means has four outputs corresponding to "busy", "free", "calling for service" and "parked" line states respectively, and further has a progressive store acting as a memory to provide, during scanning of the subscriber line terminals of any line address, an output signal in response to an output signql received, during scanning of the same line terminals in the preceding scanning cycle, from either the said common output from said comparators or the said progressive store itself, the arrangement being such that the line state discriminator provides an output signal from said first output in response to input signals received at both inputs thereof, provides an output signal from the second output when no output signal is received from the gate means, provides an output signal from the third output when an output signal is received from the line gate means but no output is received from siad common comparator output or from said progressive store, and provides an output signal from said fourth output when an output signal is received from the line gate means, no output signal is received from said common comparator output and an output signal appears at the output from said progressive store.

* * * * *